(12) United States Patent
Pacheco Tanaka et al.

(10) Patent No.: US 12,280,340 B2
(45) Date of Patent: Apr. 22, 2025

(54) CARBON MOLECULAR SIEVE MEMBRANE AND ITS USE IN SEPARATION PROCESSES

(71) Applicants: FUNDACION TECNALIA RESEARCH & INNOVATION, Derio-Bizkaia (ES); EINDHOVEN UNIVERSITY OF TECHNOLOGY, Eindhoven (NL)

(72) Inventors: David Alfredo Pacheco Tanaka, Donosita-San Sebastián Gipuzkoa (ES); Margot Anabell Llosa Tanco, Donosita-San Sebastián Gipuzkoa (ES); Maria Luisa Vittoria Nordio, Sant'Angelo Lodigiano (IT); Jose Antonio Medrano Jimenez, Eindhoven (NL); Fausto Gallucci, Heeze (NL)

(73) Assignees: FUNDACION TECNALIA RESEARCH & INNOVATION, Guipuzcoa (ES); EINDHOVEN UNIVERSITY OF TECHNOLOGY, Eindhoven (NL)

( * ) Notice: Subject to any disclaimer, the term of this patent is extended or adjusted under 35 U.S.C. 154(b) by 376 days.

(21) Appl. No.: 17/784,580

(22) PCT Filed: Dec. 10, 2020

(86) PCT No.: PCT/EP2020/085597
§ 371 (c)(1),
(2) Date: Jun. 10, 2022

(87) PCT Pub. No.: WO2021/116319
PCT Pub. Date: Jun. 17, 2021

(65) Prior Publication Data
US 2022/0347632 A1    Nov. 3, 2022

(30) Foreign Application Priority Data
Dec. 11, 2019    (EP) .................................. 19383095

(51) Int. Cl.
*B01D 71/02*    (2006.01)
*B01D 17/02*    (2006.01)
(Continued)

(52) U.S. Cl.
CPC ......... *B01D 71/0212* (2022.08); *B01D 17/02* (2013.01); *B01D 53/228* (2013.01);
(Continued)

(58) Field of Classification Search
None
See application file for complete search history.

(56) References Cited

U.S. PATENT DOCUMENTS

| 5,912,048 A | 6/1999 | Rao et al. | |
| 2010/0083837 A1* | 4/2010 | Ichikawa | B01D 71/021 96/6 |

(Continued)

FOREIGN PATENT DOCUMENTS

WO    WO 2013/181407    12/2013

OTHER PUBLICATIONS

Llosa Tanco, Margot A. et al., "Composite-alumina-carbon molecular sieve membranes prepared from novolac resin and boehmite. Part I: Preparation, characterization and gas permeation studies", International Journal of Hydrogen Energy, 40, 2015, pp. 5653-5663. (Year: 2015).*

(Continued)

*Primary Examiner* — Jason M Greene
(74) *Attorney, Agent, or Firm* — Squire Patton Boggs (US) LLP

(57) ABSTRACT

It is provided a water-saturated carbon molecular sieve membrane obtainable by a) providing a hydrophilic carbon molecular sieve membrane (CMSM) comprising pores of a pore size from 0.25 nm to 0.55 nm for molecular sieving, pores of a pore size from 0.55 nm to 0.90 nm for adsorption (Continued)

diffusion and a negligible amount of pores larger than 0.90 nm such that a plot of $N_2$ permeance versus pressure of permeation at room temperature and at a pressure from 1 to 4 bar has zero or negative slope; and b) humidifying the membrane until obtaining a water-saturated carbon molecular sieve membrane. It is also provided a process for the separation of a gas from a gas mixture with such a water-saturated membrane, and its use for solvent dehydration, and as a membrane reactor.

20 Claims, 24 Drawing Sheets

(51) Int. Cl.
| | |
|---|---|
| B01D 53/22 | (2006.01) |
| B01D 67/00 | (2006.01) |
| B01D 69/02 | (2006.01) |
| B01D 69/12 | (2006.01) |
| C02F 1/44 | (2023.01) |

(52) U.S. Cl.
CPC ..... B01D 67/0067 (2013.01); B01D 67/0088 (2013.01); B01D 69/02 (2013.01); B01D 69/12 (2013.01); C02F 1/44 (2013.01); B01D 2323/02 (2013.01); B01D 2325/36 (2013.01)

(56) References Cited

U.S. PATENT DOCUMENTS

| | | | | |
|---|---|---|---|---|
| 2013/0081991 | A1* | 4/2013 | Ito | B01D 71/021 |
| | | | | 210/321.72 |
| 2015/0038598 | A1* | 2/2015 | You | C10G 2/332 |
| | | | | 422/187 |

OTHER PUBLICATIONS

International Search Report and Written Opinion mailed Feb. 24, 2021 for International Application No. PCT/EP2020/085597, 15 pages.
Campo et al: "Carbon molecular sieve membranes from cellophane paper", Journal of Membrane Science; Jan. 4, 2010; vol. 350, pp. 180-188.
Llosa Tanco et al: "Composite-alumina-carbon molecular sieve membranes prepared from novolac resin and boehmite. Part I: Preparation, characterization and gas permeation studies", International Journal of Hydrogen Energy; Mar. 23, 2015; vol. 40(16), pp. 5653-5663.
Llosa Tanco et al: "Composite-alumina-carbon molecular sieve membranes prepared from novolac resin and boehmite. Part II: Effect of the carbonization temperature on the gas permeation properties", International Journal of Hydrogen Energy; Mar. 1, 2015, vol. 40(8), pp. 3485-3496; XP055775484; doi:10.1016/j.ijhydene.2014.11.025, ISSN 0360-3199.
Melendez et al: "Preparation and characterization of ceramic supported ultra-thin (~1 μm) Pd—Ag membranes", Journal of Membrane Science; Jan. 9, 2017; vol. 528, pp. 12-23.
Nguyen et al: "Adsorption of supercritical gases in porous media: Determination of micropore size distribution", J. Phys. Chem. B. 1999; vol. 103 (33), pp. 6900-6908.
Nguyen et al: "The structural characterization of carbon molecular sieve membrane (CMSM) via gas adsorption" Journal of Membrane Science 2003; vol. 220(1-2), pp. 177-182.
Rodrigues et al: "Preparation and characterization of carbon molecular sieve membranes based on resorcinol-formaldehyde resin", Journal of Membrane Science; Feb. 28, 2014, vol. 459, pp. 207-216.
Teixeira et al: "Carbon-Al2O3—Ag composite molecular sieve membranes for gas separation", Chemical Engineering Research and Design 2012; vol. 90, pp. 2338-2345.
Teixeira et al: "Composite phenolic resin-based carbon molecular sieve membranes for gas separation", Carbon; Jun. 12, 2011; vol. 49, pp. 4348-4358.
Forster et al., "Tailoring pore structure and surface chemistry of microporous Alumina-Carbon Molecular Sieve Membranes (Al-CMSMs) by altering carbonization temperature for optimal gas separation performance: An investigation using low-field NMR relaxation measurements", Chemical Engineering Journal 2021, vol. 424, Issue 129313.
Poto et al., "Vapor/gas separation through carbon molecular sieve membranes: Experimental and theoretical investigation", International Journal of Hydrogen Energy 2002, vol. 47, pp. 11385-11401.
Poto et al., "Carbon molecular sieve membranes for water separation in CO2 hydrogenation reactions: Effect of the carbonization temperature", Journal of Membrane Science 2023, vol. 677, Issue 121613.
Rahimalimamaghani et al., "Tailoring the properties of carbon molecular sieves membranes for the separation of propionic acid from aqueous solutions", Journal of Membrane Science 2025, vol. 713 Issue 123316.

\* cited by examiner a)

b)

$H_2O / H_2$ $H_2O$ / $CH_4$ $H_2O$ / $CO_2$

CARBON MOLECULAR SIEVE MEMBRANE AND ITS USE IN SEPARATION PROCESSES

CROSS-REFERENCE

The present application is a national-phase filing under 35 U.S.C. § 371 of International Application No. PCT/EP2020/085597 (filed Dec. 10, 2020), which claims the benefit of European Patent Application 19383095.7 (filed Dec. 11, 2019), both of which applications are incorporated herein by reference in their entirety.

TECHNICAL FIELD

The invention relates to the field of gas separation processes. More particularly, it relates to a particular composite carbon molecular sieve membrane pretreated with water vapor and to its use in gas separation processes, solvent dehydration and as membrane reactors.

BACKGROUND ART

Comparing with other techniques, membrane separation processes have relatively low energy requirements and low maintenance costs. Two parameters characterize the separation performance of membranes: permeation and selectivity.

Carbon molecular sieve membranes (CMSM) have been considered as the last generation of membrane technology, since they have a unique microporous structure. The main advantage of CMSM is that its pore size distribution (PSD) can be tailored to suit a desired separation. The distribution consists of pores of 0.5-2 nm (known as micropores or galleries) connected by smaller pores of a size less than 0.7 nm (known as ultra-micropores). Large micropores provide higher permeation and sorption sites for strongly adsorbable molecules decreasing at the same time the passage of less adsorbing ones (adsorption diffusion mechanism); the ultra-micropores are responsible for the separation by molecular sieving mechanism where only the molecules with smaller size than the pore will permeate. The combination of these two mechanisms of transport provides the high permeability and selectivity characteristics of these materials.

M. A. Llosa et al. ("Composite-alumina-carbon molecular sieve membranes prepared from novolac resin and boehmite. Part I: Preparation, characterization and gas permeation studies", *Int. J. Hydrogen Energy.* 2015, Vol. 40, pp. 5653-5663) reported for the first time the preparation of 3 µm thick defect free supported composite alumina-CMSM (Al-CMSM) using novolac phenolic resins and boehmite as precursors on alumina tubes (200 nm pore size) in one-dip-dry-carbonization cycle. The pore size and pore size distribution and hydrophilicity of the pores were tuned by changing the temperature of carbonization of the membrane (M. A. Llosa et al. "Composite-alumina-carbon molecular sieve membranes prepared from novolac resin and boehmite. Part II: Effect of the carbonization temperature on the gas permeation properties", *Int. J. Hydrogen Energy.* 2015, Vol. 40, pp. 3485-3496). Thus, they reported the influence of carbonization temperature on pore size distribution and permeation properties of these Al-CMSMs carbonized at temperatures from 450° C. to 1000° C. Selectivity and permeation properties of the membrane can also be controlled by changing the amount of water adsorbed in the pores by adjusting the permeation temperature.

The separation of hydrogen present in low concentration in a mixture with methane is of great interest for the foreseeing hydrogen economy. Hydrogen can be stored and distributed using the existing natural gas grids. For safety reasons, hydrogen content in distribution gas admixtures should be low (around 10%). Then, the hydrogen should be separated at the end users' site.

On the other hand, researchers are continuously working on the development of better processes, catalysts and adsorbents to increase the efficiency of fuel and petrochemical productions which is highly dependent on the separation processes and their improvement. A good alternative to solve this problem is to develop membrane reactors. A membrane reactor (MR) is a device for simultaneously performing a reaction (steam reforming, dry reforming, auto-thermal reforming, methanol synthesis, etc.) and a membrane-based separation in the same physical device. The continuous extraction of one of the products can shift the equilibrium, enhancing yield and selectivity as compared with a traditional system.

Besides, highly concentrated and anhydrous solvents are of great importance in chemical industry, therefore efficient dehydration processes are being developed. In this context, hydrophilic carbon molecular sieves membranes are very good candidates.

Thus, there continues to be a need of better processes using CMSMs which allows either obtaining higher purities in gas separation processes, and better efficiencies in membrane reactors and solvent dehydration.

SUMMARY OF INVENTION

Inventors have found that pre-treating a particular CMSM with water vapor in order to get a water-saturated membrane before performing a gas separation process, the selectivity of the membrane is significantly increased, and it is done in a reproducible way. Particularly, in the water-saturated membrane, filling the pores with water helps to increase the permeation of adsorbable gases (adsorption-diffusion mechanism) and at the same time increase the selectivity, decreasing the permeation of the non-adsorbable gases.

Thus, an aspect of the invention relates to water-saturated carbon molecular sieve membrane obtainable by:

i) providing a hydrophilic carbon molecular sieve membrane (CMSM) comprising pores of a pore size from 0.25 nm to 0.55 nm for molecular sieving, and of a pore size from higher than 0.55 nm to 0.90 nm for adsorption diffusion and a negligible amount of pores larger than 0.90 nm, wherein the CMSM has a negligible amount of pores larger than 0.90 nm when a plot of $N_2$ permeance versus pressure of permeation at room temperature and at a pressure from 1 to 4 bar has zero or negative slope; and ii) humidifying the CMSM prepared in step i) to obtain a water-saturated CMSM by:
treating it with water vapor at a temperature from 5° C. to 180° C. and at atmospheric pressure and a relative humidity higher than 95% such as of 99% during a period of time such that, after further treatment with water vapor, the permeation flux of a non-adsorbable gas such as $N_2$ or He at 4 bar at the temperature at which the CMSM has been treated with water vapor is constant during a particular period of time such as a period of 3 hours; or
alternatively, by exposing it to a $N_2$ or He gas stream saturated with water by bubbling the gas at a temperature from 5° C. to 180° C. into a tank filled with water such that after further exposure to the $N_2$ or He gas stream saturated with water, the permeation flux of a non-adsorbable gas such as $N_2$ or He at 4 bar and at the mentioned temperature is constant during a particular period of time such as a period of 3 hours.

CMSMs used of step i) comprise pores of specific pore sizes as defined herein and "a defect-free structure", i.e. a structure that does not exhibit defects that could affect the gas separation properties of the membrane (i.e. their permeance and selectivity). A CMSM comprising pores of such a pore size is considered to be "defect-free" when the amount of pores larger than 0.90 nm is negligible, that is when a plot of $N_2$ permeance versus pressure of permeation at room temperature and at a pressure from 1 to 4 bar has zero or negative slope. The combination of these features, i.e. having pores of the mentioned pore size and the absence of defects in the porous structure allows obtaining the effect sought when humidifying the CMSM as defined in step ii).

Another aspect of the invention relates to a process for the preparation of a water-saturated composite alumina-carbon molecular sieve membrane (water-saturated Al-CMSM) comprising:

i) preparing a hydrophilic Al-CMSM by:
   providing a porous $\alpha$-$Al_2O_3$ support;
   preparing a solution containing from 5 to 20 wt % of phenol formaldehyde resin, from 0.5 to 5 wt % of formaldehyde, from 0.1 to 2 wt % of ethylenediamine, from 0.1 to 5 wt % of boehmite in N-methyl-2-pyrrolidone, and heating the solution (for instance, from 80 to 110° C., for ½ to 3 h) to carry out a pre-polymerization process in order to obtain a coating solution;
   dip-coating the porous $\alpha$-$Al_2O_3$ support in the coating solution in order to obtain a coated support;
   drying the coated support at a temperature from 70 to 120° C. in order to complete the polymerization process;
   carbonizing the dried coated support at a carbonization temperature from 450° C. to 750° C. in order to obtain a Al-CMSM;

ii) humidifying the Al-CMSM prepared in step i) to obtain a water-saturated Al-CMSM by:
   treating it with water vapor at a temperature from 5° C. to 180° C. and at atmospheric pressure and a relative humidity higher than 95% such as of 99% during a period of time such that, after further treatment with water vapor, the permeation flux of a non-adsorbable gas such as $N_2$ or He at 4 bar at the temperature at which the CMSM has been treated with water vapor is constant during a particular period of time such as a period of 3 hours; or
   alternatively, by exposing it to a $N_2$ or He gas stream saturated with water by bubbling the gas at a temperature from 5° C. to 180° C. into a tank filled with water such that after further exposure to the $N_2$ or He gas stream saturated with water, the permeation flux of a non-adsorbable gas such as $N_2$ or He at 4 bar and at the mentioned temperature is constant during a particular period of time such as a period of 3 hours.

Another aspect of the invention is a water-saturated Al-CMSM obtainable by the process defined above.

Another aspect of the present invention relates to process for the separation of a gas from a gas mixture, the process comprising:

a) providing a water-saturated membrane as defined herein above and below;
b) providing a gas mixture comprising at least two gases;
c) feeding the gas mixture to the water-saturated CMSM at a temperature from 5° C. to 300° C. in order to get a retentate and a permeate, wherein feeding is carried out at a pressure such that the partial pressure of the gas in the retentate is higher than the partial pressure of the gas in the permeate and such that the membrane is still a water-saturated membrane, i.e. a difference in permeation is observed compared to the same CMSM membrane without having been subjected to an humidifying step in order to get a water saturated membrane at the feeding temperature and pressure.

Surprisingly, as shown in the examples, the water-saturated CMSM is not affected by external mass transfer limitations (concentration polarization) when working with gas mixtures. Thus, as an instance, in the separation of hydrogen present in a gas mixture the dependence of the hydrogen partial pressure difference and the hydrogen flux is almost linear, independently of the concentration of $H_2$ in the mixture.

Another aspect of the present invention relates to the use of a water-saturated CMSM as defined herein above and below for the separation of a gas from a gas mixture.

Inventors have also realized that the water-saturated CMSM as defined herein above and below is also useful for the dehydration of organic solvents and as membrane reactors. Thus, these uses also form part of the present invention.

DETAILED DESCRIPTION OF THE INVENTION

Figure 1:
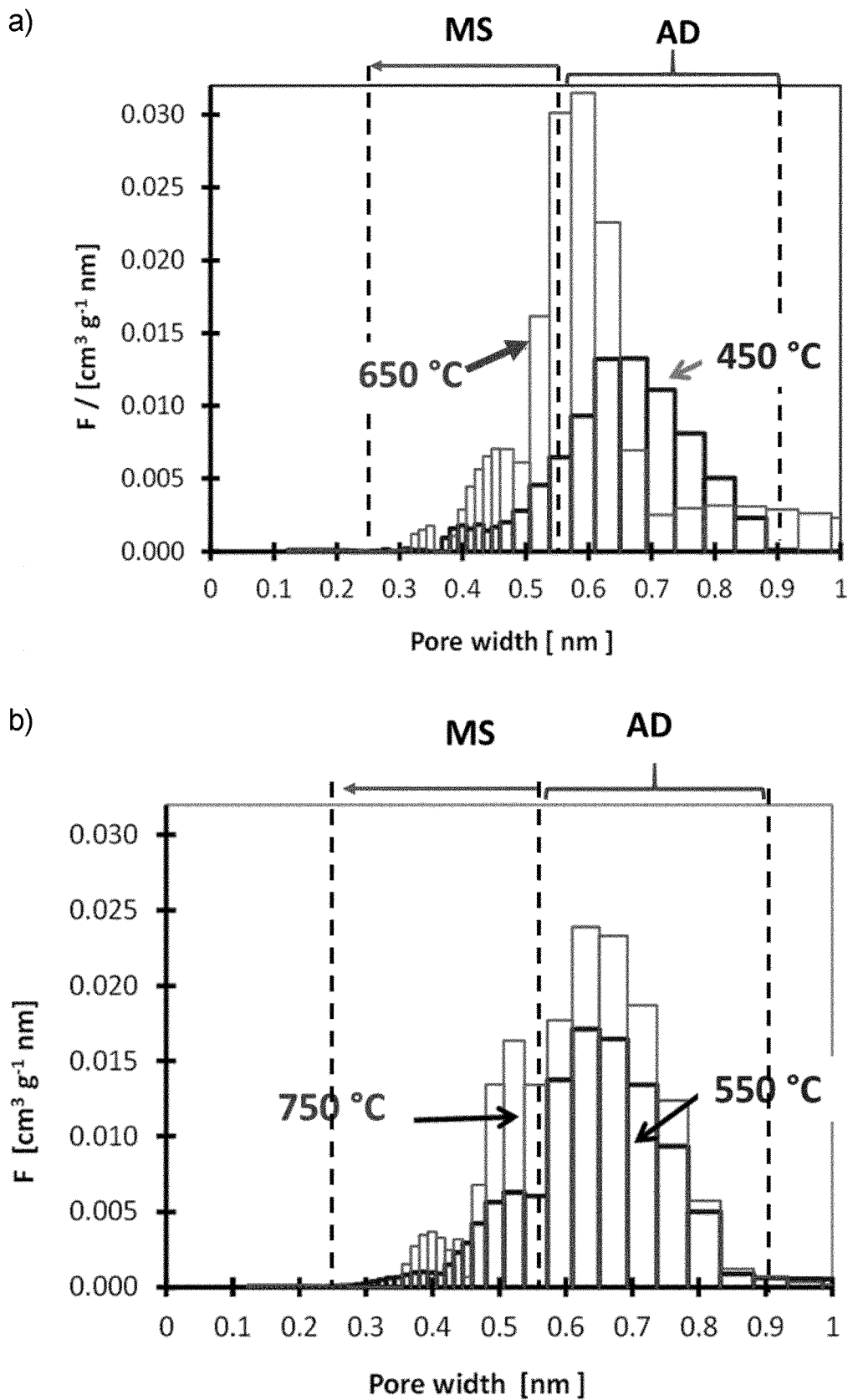
FIG. 1 shows the micropore size distribution of carbon membranes carbonized at: a) 450 and 650° C., b) 550 and 750° C. MS: Molecular sieving region, AD: adsorption diffusion region.

All terms as used herein in this application, unless otherwise stated, shall be understood in their ordinary meaning as known in the art. Other more specific definitions terms as used in the present application are as set forth below and are intended to apply uniformly throughout the specification and claims unless an otherwise expressly set out definition provides a broader definition.

The term "permeation flow" is defined as the volume of the gas passing through the membrane per unit time. This value is determined experimentally with a soap flow meter.

The term "permeation flux" is defined as the volume flowing through the membrane per unit area per unit time. This value is calculated from the "permeation flow" divided by the membrane's area.

The term "permeance" is defined as the volume of the feed gas passing through a unit area of membrane at unit time and under unit pressure gradient, the common unit used in CMSM is mol·m$^{-2}$ s$^{-1}$·Pa$^{-1}$. This value is calculated from the "permeation flux" divided by the difference of pressure between the retentate and permeate.

The term "permeability" is defined as the transport flux of material through the membrane per unit driving force per unit membrane thickness.

The term "perm-selectivity" or ideal selectivity related to a gas refers to the ratio of the permeance of two gases at the same temperature.

The term "composite alumina-carbon molecular sieve membrane" or "Al-CMSM" refers to a carbon membrane with nanoparticles of alumina dispersed in the carbon matrix.

The term "water-saturated CMSM" or "hydrated CMSM" refers to a CMSM (including a supported Al-CMSM) containing an amount of water corresponding to that that would contain a CMSM which has been treated at a temperature from 5° C. to 180° C., such as at room temperature, and at atmospheric pressure and a relative humidity higher than 95% such as of 99% with water vapor during a period of time such that after further treatment with water vapor, the permeation flux of a non-adsorbable gas such as $N_2$ or He at 4 bar at the temperature at which the CMSM has been treated with water vapor is constant during a particular period of time such as a period of 3 hours. Alternatively, a "water-saturated CMSM" can be obtained by exposing the CMSM to a $N_2$ or He gas stream saturated with water by bubbling the gas at a temperature from 5° C. to 180° C., such as at room temperature, into a tank filled with water such that after further exposure to the $N_2$ or He gas stream saturated with water, the permeation flux of a non-adsorbable gas such as $N_2$ or He at 4 bar and at the mentioned temperature is constant during a particular period of time such as a period of 3 hours.

Generally, and particularly at temperatures higher than 180° C., a water saturated CMSM is such that contains at least an amount of water corresponding to that that would contain a CMSM which has been subjected to a humidification treatment carried out at the temperature and pressure at which the permeation will be performed in order to fill the pores with water until no more water is hold such that, due to the presence of water in the pores, a difference in permeation is observed compared to the same CMSM without having been subjected to such humidification process.

The term "hydrophilic CMSM" refers to a CMSM such that, before being humidified to obtain a water-saturated CMSM, the $N_2$ permeance at 300° C. and at a pressure difference of 4 bar is higher than 7×10$^{-9}$ mol m$^2$ s$^{-1}$Pa$^{-1}$ and, after being humidified to obtain a water-saturated CMSM, the $N_2$ permeance at room temperature and at a pressure difference of 1 bar is lower than 1×10$^{-9}$ mol m$^2$ s$^{-1}$Pa$^{-1}$.

Membrane processes are characterized by the fact that a feed stream which is a gas mixture is divided into two streams: the retentate and the permeate. The retentate is that part of the feed that does not pass through the membrane, while the permeate is that part of the feed that does pass through the membrane, i.e. the separated gas. In order to separate a gas from a gas mixture, the partial pressure of the gas in the retentate should be higher than the pressure of the permeate.

Thus, the permeation of a desired gas will depend on the partial pressure difference of that gas in the retentate and in the permeate. For example, for a feed which is a mixture of 10% $H_2$ and 90% $CH_4$, if in the permeate the pressure is the atmospheric pressure (1 bar), the pressure in the feed must be higher than 10 bar, i.e. the partial pressure of the $H_2$ in the feed must be higher than 1 bar.

The term "pressure difference" for refers to the difference of the gas pressure in the retentate and the gas pressure in the permeate.

The term "partial pressure difference" for a given gas refers to the difference of the gas partial pressure in the retentate and the gas partial pressure in the permeate.

The term "negligible" refers to a value that either coincides with zero within the context of the measurement accuracy or is less than a defined threshold value, which for example takes into account a deviation from zero, which is hardly avoidable for structural reasons or which do not have any significant effect on the performance in terms of permeance and selectivity of the CMSM. In order to verify whether the CMSM has a "negligible amount of pores larger than 0.90 nm", that is whether it has a defect-free structure, the CMSM must be capable of presenting a plot of $N_2$ permeance versus pressure of permeation at room temperature and at a pressure from 1 to 4 bar having zero or negative slope.

The term "room temperature" refers to a temperature of about 20° C. to about 25° C.

The term "atmospheric pressure" as used herein is intended to refer to an atmospheric pressure at substantially 101.325 kPa (i.e. 760 mm Hg)±15 kPa.

As used herein, the term "%" or "concentration" of a gas component in a gas mixture refers to the amount by volume of the single gas component relative to the total volume of the gas mixture or, if specifically mentioned, of other gas component or components in the gas mixture.

It is noted that, as used in this specification and the appended claims, the singular forms "a", "an", and "the" include plural referents unless the context clearly dictates otherwise.

As mentioned above the present invention relates to a water-saturated carbon molecular as defined above.

These carbon membranes present a porous structure where the permeation mechanism is a result of molecular sieving (pore range 0.25-0.55 nm) and/or a surface diffusion (0.5-0.90 nm). CMSMs such as Al-CMSMs are produced by the carbonization of a polymeric precursor under an inert atmosphere or vacuum, such as at a temperature of from 250° C. to 2500° C., or of from 450° C. to 1500° C., particularly from 500° C. to 800° C. (cf. Llosa MA et al. (Part I) 2015; Campo M C et al. 2010). Examples of polymeric precursors include, without being limited to, polyimides, polyfurfuryl alcohol, phenolic resins, cellulose, cellulosic derivatives, and poly(vinylidene chloride). Phenolic resins, such as resol and novolac resins, are desirable precursors to prepare CMSMs, since they present the advantage of being inexpensive and possess high carbon yield, withstanding elevated temperatures without losing their shape.

Phenolic resins are the product of the poly-condensation reaction of phenol with formaldehyde; their structure and properties depend on the formaldehyde/phenol ratio (F/P), catalyst, pH and temperature. There are two forms of phenolic resins: resol and novolac. Resol resins are the product of basic catalysis in excess of formaldehyde (F/P>1). Novolac resins are obtained in acidic media and the amount of formaldehyde is lower, usually with an F/P of ca. 0.75-0.85.

In an embodiment of the process for the preparation of water-saturated Al-CMSM of the present disclosure and of the water-saturated Al-CMSM obtainable by this process, the phenol formaldehyde resin is a novolac resin.

In another embodiment of the process for the preparation of water-saturated Al-CMSM of the present disclosure and of the water-saturated Al-CMSM obtainable by this process, optionally in combination with one or more features of the particular embodiments defined above, the carbonization temperature is from 450° C. to 700° C., particularly from 500° C. to 650° C., such as 550° C. or 600° C.

Before carbonization, for the self-supported membranes, the polymeric precursor is shaped (for example films, hollow fiber); for the supported membrane, they are produced generally by dipping (coating) a porous support into a solution containing the polymer precursor.

As mentioned above, the humidification of the membrane is carried out in order to obtain a CMSM containing at least an amount of water corresponding to that that would contain a CMSM which has been:

treated with water vapor at a temperature from 5° C. to 180° C. (such as at 20° C., 25° C., 40° C., 70° C., 100° C., or 120° C.), atmospheric pressure and a relative humidity higher than 95% (particularly of 99%) during a period of time such that after further treatment with water vapor the gas permeation flux of the membrane at the temperature at which the CMSM has been treated with water vapor and at 4 bar for a non-adsorbable gas such as $N_2$ or He is constant during a particular period of time such as a period of 3 hours, or exposed to a gas stream saturated with water by bubbling the gas at a temperature from 5° C. to 180° C. (such as at 20° C., 25° C., 40° C., 70° C., 100° C., or 120° C.) into a tank filled with water such that after further exposure to the gas stream saturated with water, the permeation flux of a non-adsorbable gas such as $N_2$ or He, at 4 bar and at the mentioned temperature is constant during a particular period of time such as a period of 3 hours.

Permeation flux was determined with a soap flow meter at the mentioned temperatures and pressure.

In another embodiment, of the water-saturated carbon molecular sieve membrane of the present invention, optionally in combination with one or more features of the particular embodiments defined above, at temperatures higher than 180° C. (such as of 200° C., 250° C. or 300° C.) the humidification of the membrane is carried out in order to obtain a CMSM containing at least an amount of water corresponding to that that would contain a CMSM which has been subjected to a humidification treatment carried out at the temperature and pressure at which the permeation will be performed in order to fill the pores with water until no more water is hold such that, due to the presence of water in the pores, a difference in permeation is observed compared to the same CMSM without having been subjected to such humidification process.

In an embodiment, the humidification of the membrane is carried out at room temperature, atmospheric pressure and a relative humidity higher than 95% such as of 99% during a period of time such that after further treatment with water vapor the gas permeation flux of the membrane at the temperature at which the CMSM has been treated with water vapor and at 4 bar for a non-adsorbable gas such as $N_2$ or He is constant during a particular period of time such as a period of 3 hours.

In an embodiment of the water-saturated carbon molecular sieve membrane of the present invention, optionally in combination with one or more features of the particular embodiments defined above, the CMSM is a composite alumina-carbon molecular sieve membrane (Al-CMSM). Particularly, the Al-CMSM has a nitrogen content from 0.1 wt % to 4.0 wt %, an alumina content from 2.5% to 50% and a carbon content from 50 wt % to 95 wt %, with respect to the total weight of the membrane.

Al-CMSMs can be prepared using the materials and the one dip-dry-carbonization method on porous alumina supports described in Llosa M A et al. (Part I) 2015 (see the Experimental section in p. 5655), but for the carbonization temperature, which is selected at will. Other examples of Al-CMSMs are disclosed for instance in Teixeira et al. 2011, Teixeira et al. 2012, Rodrigues et al. 2014.

Pore Size Characterization

The pore size and pore size distribution of the carbon molecular sieve membranes was calculated using the data obtained from the adsorption equilibrium of $CO_2$ at 0° C. The adsorption equilibrium isotherm of $CO_2$ was acquired by the gravimetric method in a Rubotherm suspension magnetic balance with a precision of $10^{-5}$ mg. Details of how to determine the pore size distribution of CMSMs can be found in Nguyen C. and Do, D. D. 1999, and Nguyen C., et al. 2003.

The water vapor pre-treatment of the membrane in order to obtain a water-saturated CMSM can be performed inside or outside the permeator.

Water Vapor Pre-Treatment Outside the Permeator.

To obtain a water-saturated CMSM, a hydrophilic CMSM as defined above is introduced at a temperature from 5 to 180° C., such as from 5 to 120° C., particularly at room temperature, and a relative humidity higher than 95% such as of 99% in a close container where water is present, until no more water is hold in order to fill the pores with water.

In order to know when the membrane is saturated with water, the gas permeation flux of the membrane at the mentioned temperature, such as at room temperature, and 4 bar is monitored until it is constant during a particular period such as a period of 3 hours. The gas used is a non-adsorbable gas at the temperature of permeation (e.g. at room temperature) such as $N_2$ or He.

Water Vapor Pre-Treatment Inside the Permeator

As an alternative method to obtain a water-saturated CMSM, the CMSM is introduced in a permeator and the permeator is fed, preferably at room temperature, with: (i) a gas stream saturated with water, obtained for instance by bubbling the gas stream to a tank filled with water before feeding it to the permeator; or (ii) water vapor or a mixture of gases containing water. The time of treatment can be from 1 minute to several hours.

After the treatment, the gas flux of the non-adsorbable gas (i.e $N_2$ or He) at 4 bar is measured. The treatment and gas permeation cycle are repeated until the gas permeation is constant during a period of 3 hours.

Uses of the Water-Saturated CMSM of the Invention

As mentioned above the present invention also relates to a process for the separation of a gas in a gas mixture by using a water-saturated CMSM as defined above having some specific features.

Thus, a CMSM having some specific features of pore size, pore size distribution and hydrophilicity is subjected to a humidification pre-treatment until it is saturated with water (at the permeation conditions of pressure and temperature). The gas mixture comprises at least two gases and is fed to the water-saturated CMSM at a pressure such that the partial pressure of the gas in the retentate is higher than the partial pressure of the gas in the permeate and such that the membrane is still a water-saturated membrane, i.e. a difference in permeation is observed compared to the same CMSM without having been subjected to an humidifying step in order to get a water saturated membrane at the feeding temperature and pressure. The process can be carried out at a temperature from 5° C. to 300° C.

In an embodiment, optionally in combination with one or more features of the particular embodiments defined above, step (c) is carried out at a temperature from 5° C. to 250° C., from 5 to 120° C., from 15° C. to 120° C., from 15° C. to 100° C., from 15° C. to 70° C., or from 20° C. to 50° C., such as of 40° C. In a particular embodiment, step (c) is carried out at room temperature.

The gas, pure or in the form of a mixture, can be fed to the permeator through digital mass flow controllers while the pressure can be controlled with a digital back pressure regulator. The maximum retentate pressure can be for instance of 40 bar, while the permeate can be operated at different pressures down to vacuum (using a vacuum pump). Several thermocouples can be used to register the temperature profiles along the permeator.

The gas separation in the hydrophilic membranes of the present disclosure is based on molecular sieving (MS; the gases smaller that the pores will permeate) and adsorption diffusion (AD; difference in affinity of the gases with the water present in the pores. Pores of the CMSM of the present disclosure are divided in two groups (FIG. 1a): pores from 0.25 nm to 0.55 nm, where the separation is by molecular sieving, and b) pores of a pore size higher than 0.55 nm to 0.90 nm, where water is adsorbed. In the AD region, the water adsorbed in the pores reduce the size of the pores; the amount of water adsorbed will depend on the temperature, and consequently also the pore size. The gases will pass according to their size (smallest will pass faster) and the gases with more interaction (adsorption) with water in the pores (the gases with more adsorption) will permeate preferentially. The interaction with water will depend on the polarity of the gas gases with dipolar moment (i.e. water) will have more permeation. When the gases are not polar, the gases with higher polarizability will permeate faster (example $CO_2$ and $H_2$ over He).

|  | Polarizability [m$^3$] | Kinetic diameter [nm] |
| --- | --- | --- |
| He | 2 | 0.26 |
| $H_2$ | 8.2 | 0.29 |
| $CO_2$ | 26.3 | 0.33 |
| Ar | 16.6 | 0.364 |
| $N_2$ | 17.7 | 0.365 |
| $CH_4$ | 26 | 0.38 |

Polarizability of an atom or a molecule is a measure of the ease with which the electrons and nuclei can be displaced from their average positions forming an instantaneous dipole. The kinetic diameter expresses the likelihood that a molecule in a gas will collide with another molecule. It is an indication of the size of the molecule as a target. Polarizability and kinetic diameter of gases can be found in handbooks of chemical and physical data.

In another embodiment, optionally in combination with one or more features of the particular embodiments defined above, the at least two gases have a polarizability from 2 to 27, or from 2 to 26.3 and at least one of the at least two gases have a kinetic diameter less than 0.55 nm. If more than two gases have kinetic diameter lower than 0.55 nm the separation will occur where: the difference of the kinetic diameter between the at least two gases is equal to or higher than 0.01 nm; the difference of the polarizability between the at least two gases is equal to or higher than 1 m$^3$; or both of them.

Particularly, the at least two gases are selected from the group consisting of He, $H_2O$, Ne, $H_2$, NO, Ar, $NH_3$, $N_2$, $O_2$, $CO_2$, CO, $CH_4$, $C_2H_4$, $C_2H_6$, propene, $C_3H_8$ (propane), $H_2S$, methanol, ethanol, propanol, dioxane, dimethylformamide, dimethylsulfoxide, acetone, and N-methyl-2-pyrrolidone. Examples of gases having a kinetic diameter more than 0.55 nm are n-butane or iso-butane. Examples of solvents having a kinetic diameter more than 0.55 nm are $CHCl_3$, $CHCl_2$, methanol, ethanol, dimethylether, dimethylcarbonate acetone, acetonitrile, dioxane. Particularly, the at least two gases are a mixture selected from the group consisting of $H_2/CH_4$; $H_2/N_2$; $H_2/CO_2$; $CO_2/CH_4$; $CO_2/N_2$; $O_2/N_2$; and biogas.

In a particular embodiment, optionally in combination with one or more features of the particular embodiments defined above, the gas mixture comprises from 5% to 20% of $H_2$ and from 95% to 80% of $CH_4$, particularly from about 10% of $H_2$ and about 90% of $CH_4$, and wherein step c) is carried out at a hydrogen partial pressure difference equal to or higher than 3 bars, such as from 3 bars to 8 bars, and at a temperature of 40° C. or below, such as at 20° C. or at room temperature.

Advantageously, unlike other known processes, the water-saturated CMSM of the invention allows separating $H_2$ from a mixture with $CH_4$ at low temperature and, consequently, the purity of the permeate is increased.

In a particular embodiment, optionally in combination with one or more features of the particular embodiments defined above, the at least two gases are $CO_2$ and $N_2$. Particularly, the gas mixture comprises from 10% to 20% of $CO_2$ and from 65% to 75% of $N_2$, particularly about a 15% of $CO_2$ and about a 70% of $N_2$.

In a particular embodiment, optionally in combination with one or more features of the particular embodiments defined above, the at least two gases are $H_2$ and $CO_2$. Particularly, the gas mixture comprises from 55% to 65% of $H_2$ and from 30% to 40% of $CO_2$, more particularly about a 60% of $H_2$ and about a 35% of $CO_2$.

In another embodiment, optionally in combination with one or more features of the particular embodiments defined above, the gas mixture is anhydrous.

In another embodiment, optionally in combination with one or more features of the particular embodiments defined above, the gas mixture comprising at least two gases is biogas, and $CO_2$ is removed from biogas).

As mentioned above, another aspect of the present invention relates to the use of a water-saturated CMSM as defined herein above for the separation of a gas from a gas mixture.

Biogas is a gas mixture produced by the breakdown of organic matter in the absence of oxygen (anaerobically) comprising methane and carbon dioxide. Particularly, biogas is a gas mixture containing mainly methane and carbon dioxide and small quantities of other gases such as $H_2$, $H_2S$, $N_2$, and water vapor. The use of bio-methane is preferred over the biogas since the energy density of the fuel source is increased and it can be used directly in all existing and installed plants and can also be sent into the natural gas grid.

In another embodiment, the use of the water-saturated CMSM is for biogas upgrading, i.e. to remove $CO_2$ from biogas.

In another embodiment, the use of the water-saturated CMSM is for removal of $CO_2$ from a gas mixture comprising at least 50% of nitrogen. Particularly, the gas mixture comprises from 5% to 10% of $CO_2$ and from 65% to 75% of $N_2$, more particularly about a 5% of $CO_2$ and about a 70% of $N_2$.

In another embodiment, the use of the water-saturated CMSM is for the separation of $H_2$ from a gas mixture further comprising $CO_2$, particularly from the product of the pre-combustion after the water gas shift reaction, wherein the gas mixture comprises from 50% to 70% $H_2$ and from 50% to 30% $CO_2$; or for the separation of alkanes from alkenes such as of $C_2H_4$ from $C_2H_6$ for instance in a gas mixture comprising 30-70% $C_2H_4$ and 70-30% $C_2H_6$; or propane from propene, for instance in a gas mixture comprising 30-70% propene and from 70-30% propane; or propane, propene or a mixture thereof from butane, for instance in a gas mixture comprising 70-30% propane, propene or a mixture thereof and 30-70% butane.

As mentioned above, another aspect of the present invention relates to the use of a water-saturated CMSM as defined herein above for solvent dehydration, i.e. for the removal of water from an organic solvent to obtain an organic solvent containing from 0.1 to 1% of water. Examples of organic solvents include methanol, ethanol, propanol, n-butanol, iso-butanol, tert-butanol, acetone, dimethylether, dimethylcarbonate, tetrahydrofurane, acetonitrile, dioxane, acetic acid, and ethylacetate.

In the process of solvent dehydration water gas is passed through the pores by applying vacuum from the permeated side of the membrane. Since the solvent molecules are bigger or close to the biggest pore for molecular sieving (>0.55 nm) and water is very small only water will pass. In addition, water is adsorbed preferentially in the hydrophilic pores of the AD region of pores blocking the passage of the other less hydrophilic molecules. Dipolar aprotic solvents are used in organic synthesis and in the dissolution of polymers in which, very small amount or traces of water can be detrimental.

As mentioned above, another aspect of the present invention relates to the use of a water-saturated CMSM as defined herein above as a membrane reactor. The water-saturated CMSM of the present invention can be used in process intensification for the in-situ removal of water during catalytic reactions in the chemical, petrochemical, food, cosmetics sectors. Particularly in processes for the production of methane, methanol, dimethyl ether, dimethyl carbonate (DMC), or other organic solvents, where water is produced in the reactions. Examples of processes where the water-saturated CMSM of the invention can be used as a membrane reactor are the reaction of $CO_2$ and $H_2$ to produce $CH_4$; synthesis of esters by reaction of alcohols with carboxylic acids; biodiesel and biolubricants; methanol produced from $CO_2$ and $H_2$; dimethyl ether obtained by methanol dehydration or by direct synthesis from $CO_2$ and $H_2$; and synthesis of dimethylcarbonate from $CO_2$ and methanol. By the use of the water-saturated CMSM of the invention water is removed from the reaction product and the production of the compound of interest, such as of oxygenated solvents and esters.

The water-saturated CMSM of the invention have great potential because they are easier to prepare, cheaper and with better permeation properties than the zeolite membranes that are currently investigated in the field of membrane reactors, specially for the reaction of $CO_2$ and $H_2$.

As mentioned above one aspect of the present invention relates to a process for the preparation of water-saturated Al-CMSM as defined above. A water-saturated Al-CMSM obtainable by the process mentioned above also forms part of the invention.

Thus, the process for the separation of a gas from a gas mixture of the invention, can also be defined by comprising the following steps:
a) providing a water-saturated Al-CMSM as defined herein above;
b) providing a gas mixture comprising at least two gases as defined above;
c) feeding the gas mixture to the water-saturated Al-CMSM at a temperature 5° C. to 300° C., particularly from 5° C. to 250° C., in order to get a retentate and a permeate, wherein feeding is carried out at a pressure such that the partial pressure of the gas in the retentate is higher than the partial pressure of the gas in the permeate.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

EXAMPLES

Example 1

Membrane Preparation

Several Al-CMSMs were prepared using the materials and the one dip-dry-carbonization method on porous alumina supports described in Llosa M A et al. (Part I), (see the Experimental section in p. 5655), but for the carbonization temperature. Particularly, this document discloses the preparation of an Al-CMSM by carrying out the carbonization of the membrane at 500° C. Similarly, Al-CMSMs were prepared by carbonization at 500, 550, 600, 650, 750, 850 and 1000° C.

Since permeation depends on the humidity and time of storage (variation of the amount of water in the pores), the effectiveness of the pre-treatment with water vapor of an Al-CMSM was demonstrated by comparison with the performance of "dry membranes", obtained by removing most of the water present in the pores by heat treatment. The water-saturated Al-CMSM after the pre-treatment with water vapor will be named "humidified membrane".

Micropore-Size Distribution

Micropore-size distribution of the membranes carbonized at various temperatures are presented in FIG. 1. The membranes show the presence of ultra-micropores (0.25-0.55 nm range, MS region) and larger micropores (0.55 nm-0.90 nm, AD region). The membrane carbonized at 450° C. has small volume of pores with pores ranging from 0.4 nm to 0.90 nm; the membrane carbonized at 550° C. has similar pore size distribution pattern but with a significant higher pore volume. When carbonized at 650° C. a bi-disperse pore size distribution with a significantly larger volume in the MS range (from 0.25 to 0.55 nm; in the AD region most of the pores are in the range from higher than 0.55 to 0.65 nm) which could give a good compromise between selectivity and permeation. Finally comparing with 650 C, sample of 750° C. exhibits a smaller volume of small volume at the MS region and a larger volume at the AD region with a very defined pore size distribution which could help to the higher permeation. These results show that as the carbonization temperature increases the volume and the number of smaller micropores increases up to 650° C. and larger pores are formed at higher carbonization temperatures.

Permeation Test

A shell and tube apparatus equipped with a back pressure regulator (lower limit <20 kilopascal) and a soap flow meter (detection limit<0.2 ml/minute) was used to measure the permeation of gases through the supported CMSM. The selected gas was introduced into the membrane tube from outer shell and the gas permeated through the membrane was led to a soap flow meter to determine the flow rate. Gas permeation to $N_2$ was determined at room temperature (unless otherwise specified) and different pressures, while the permeate side was at atmospheric pressure.

Hydrophilicity and Water Adsorption in the Pores

Just after carbonization and avoiding the contact with air, the $N_2$ permeance of the membranes were measured.

Figure 2:
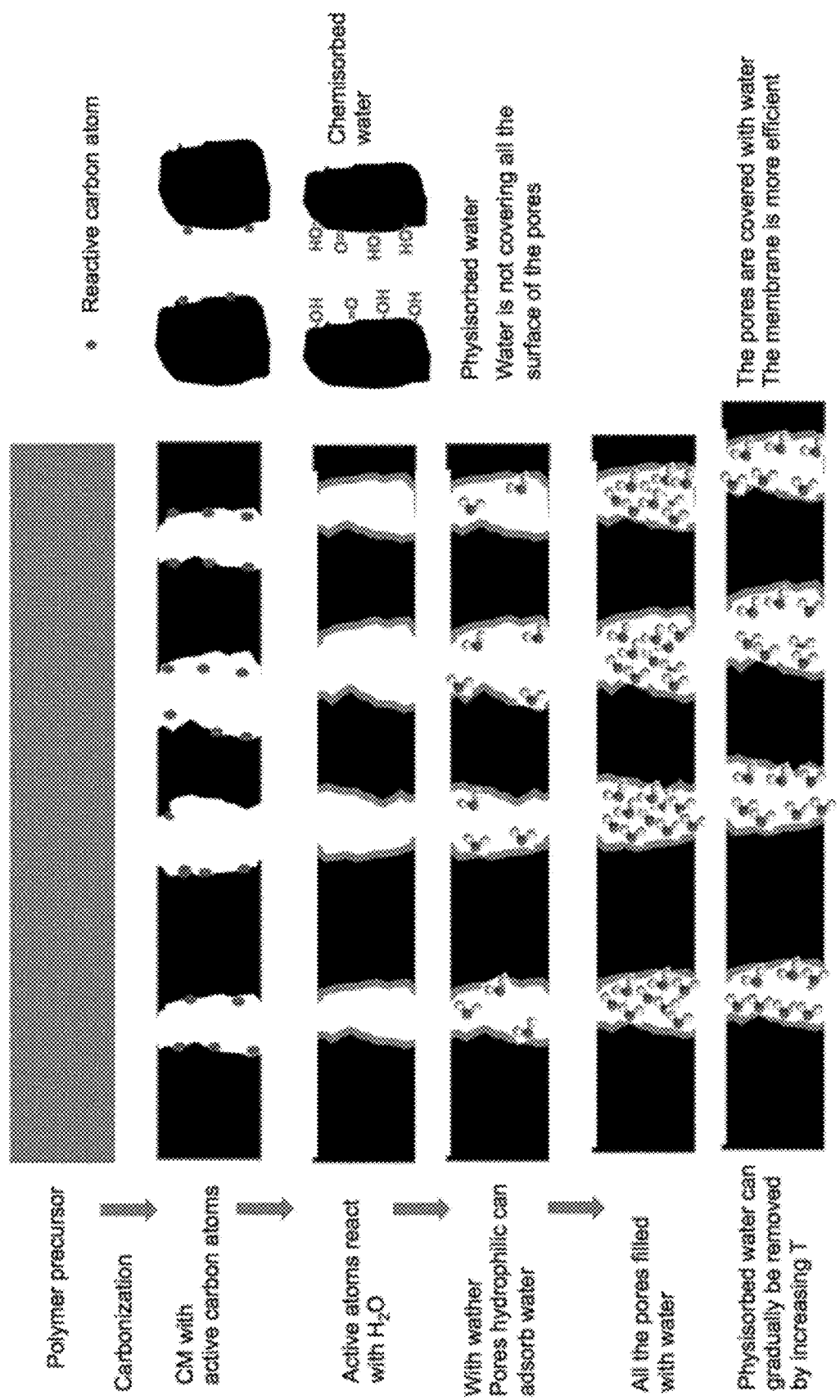
FIG. 2 depicts the changes undergone on the a CMSM: i) during the carbonization functional groups are removed leaving active carbon groups which can react with active molecules; thus, ii) water can be chemisorbed (i.e. active atoms react with water) producing functional groups containing oxygen, making the pores hydrophilic; then, iii) the hydrophilic groups can absorb water physically filling the pores reducing the pore size.

As shown in FIG. 2, during the carbonization, functional groups are removed leaving active carbon groups which can react with active molecules; thus, water can be chemisorbed producing functional groups containing oxygen, making the pores hydrophilic. Then, the hydrophilic groups can absorb water physically filling the pores reducing the pore size.

Water desorption of membranes carbonized at various temperatures was studied by measuring the permeation of $N_2$ at 400 kPa pressure difference in function of the temperature of permeation (FIG. 3a and FIG. 3b). In FIG. 3a, it can be observed that as the temperature of carbonization of the membranes increase from 450 to 600° C. the $N_2$ flux increases. At 450° C., the $N_2$ flux is low and there is not maximum, this indicates that the temperature of carbonization is low, and few pores were formed. The derivative curves of flux and temperature of permeation from FIG. 3a and FIG. 3b are presented in FIG. 4a and FIG. 4b respectively. The intensity of the derivative and the temperature of permeation corresponding to the maximum increase with the carbonization temperature; the maximum shifts with the temperature of carbonization; for carbonization temperatures of 500, 550 and 600° C., the maximum temperatures are 150, 175 and 280° C. respectively. This behaviour is related with the strength of the interaction of water with the pores. At 750 and 850° C. the $N_2$ permeation is low and no maximums are observed; at these temperatures, the pores become less hydrophilic. It can be inferred that at among the temperatures of carbonization tested at around 600-650° C. the membrane has the highest hydrophilicity trapping more water in the pores.

Figure 3:
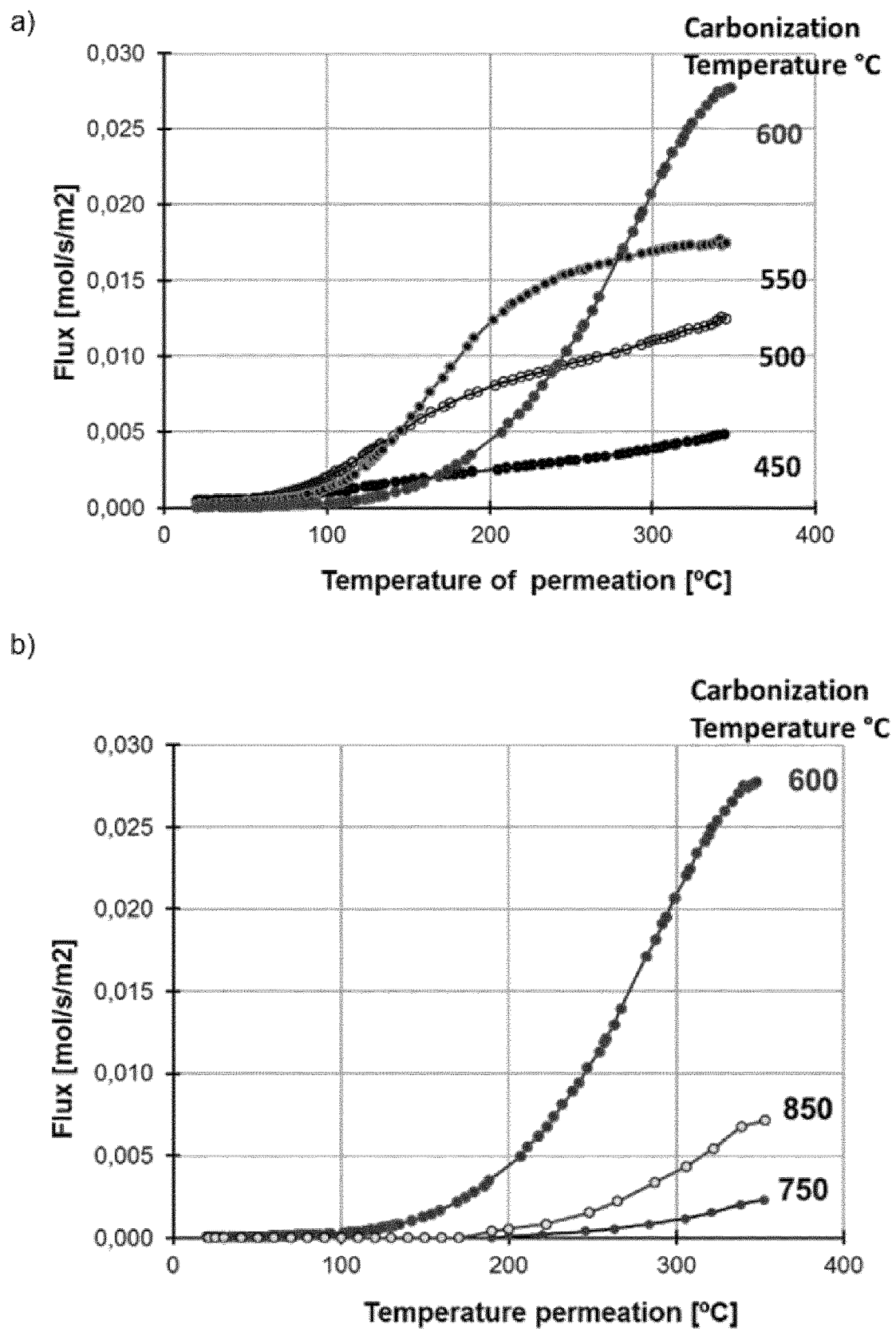
FIG. 3 shows (a, b) the $N_2$ permeation at 400 kPa pressure difference, heating time 0.7° C. min$^{-1}$.
Figure 4:
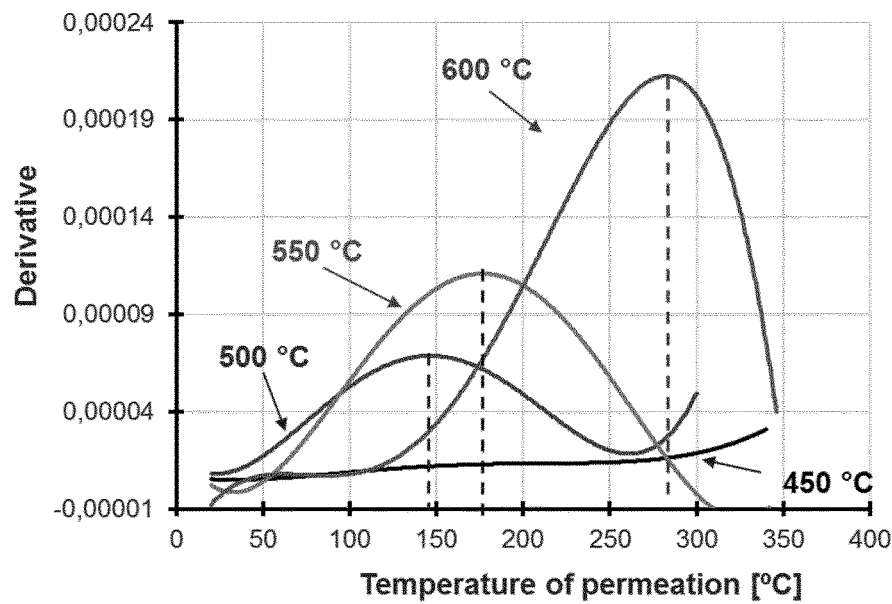
FIGS. 4a 4b shows the polynomial fitting derivative of the flux from FIGS. 3a and 3b, respectively.
Figure 4:
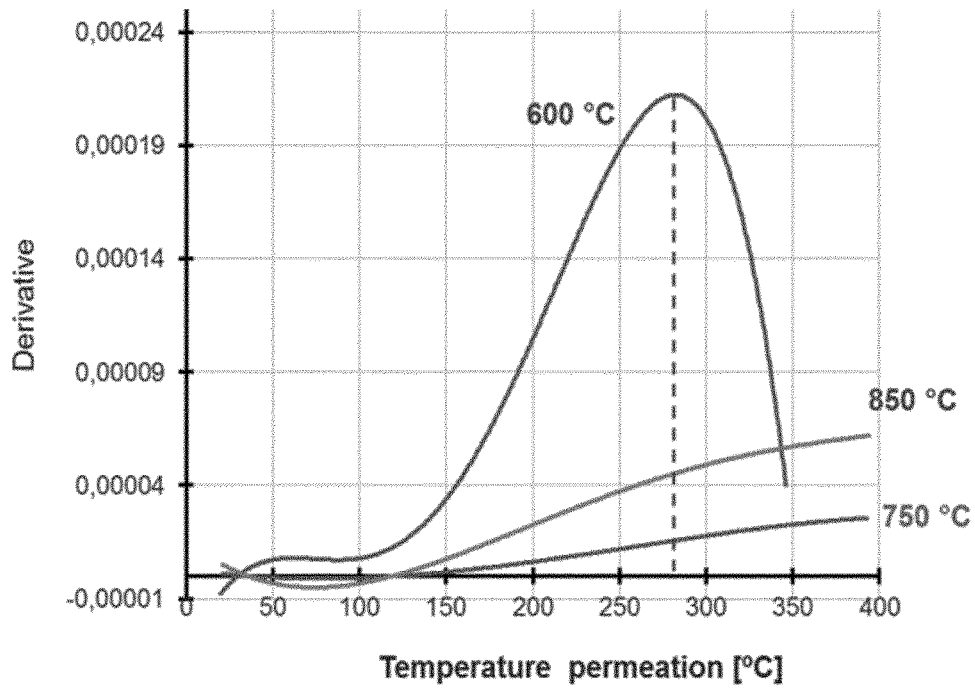

For the membrane carbonized at 500° C., the system was cooled until room temperature and without removing the membrane from the permeation reactor, a boat containing water was introduced and the $N_2$ permeance at 400 kPa in function of the time was recorded. At the beginning of the experiment, a sharp decrease of permeation is observed; water is being adsorbed in the most accessible places of the membrane. The adsorption is fast for the first 20 min, after that, a gradual small decrease in permeation is observed; the water is being adsorbed in the inner pores of the membrane. Therefore, the increase of Nitrogen permeation with the temperature in FIG. 3 is consequence of the gradual removal of water from the pores. The same membrane was again treated at 300° under Nitrogen to remove the physiosorbed water from the pores and the $N_2$ permeance with the time was measured as explained above, but this time, a boat containing hexane was introduced in the reactor. The $N_2$ permeance remains constant; this is a clear indication that the pores of the membrane are hydrophilic (i.e., hexane is hydrophobic and is not adsorbed by the pores).

Example 2

Figure 5:
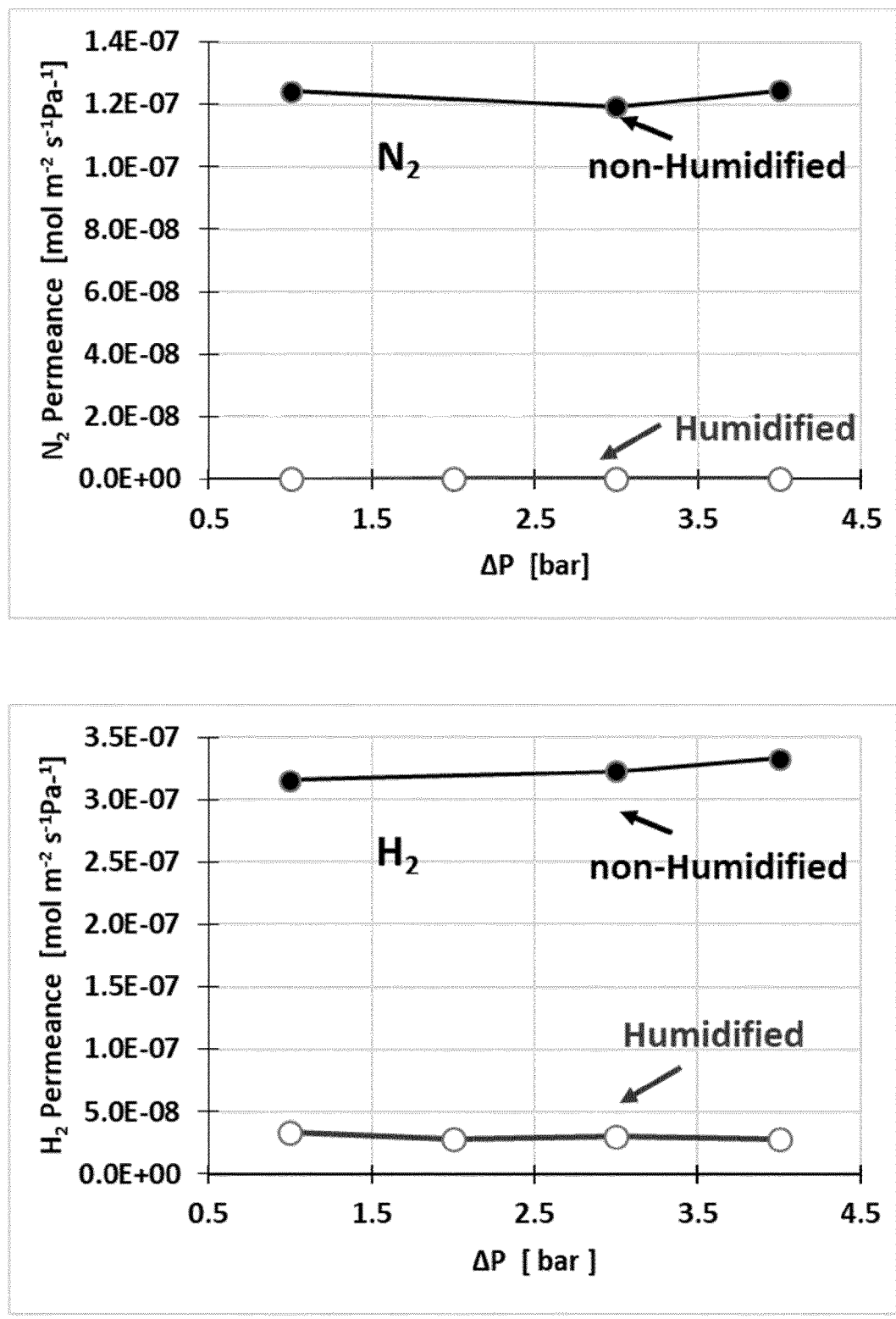
FIG. 5 shows the $N_2$ and $H_2$ permeance of an Al-CMSM. carbonized at 600° C. before humidified and after humidified (outside the reactor).

Water Vapor Pre-Treatment of an Al-CMSM Outside the Permeator 2.1 Dry Membrane
An Al-CMSM carbonized at 500° C. was heated at 200° C. under $N_2$, in order to remove the adsorbed water from the pores.
2.2 Humidified Membrane
A dry Al-CMSM prepared as disclosed above was removed from the permeator and subjected to hydration (pre-treatment with water vapor outside the permeator) by placing the membrane in a box containing water at room temperature, atmospheric pressure and a relative humidity higher than 95% such as of 99% until reaching saturation with water (humidified membrane).
2.3 Permeation Test for $N_2$ and $H_2$
Permeation of $N_2$ and $H_2$ was carried out before and after humidifying an Al-CMSM prepared as disclosed in Example 2 but for being carbonized at 600° C. The effect of hydration was evident: the permeance both of $N_2$ and $H_2$ decreases significantly (see FIG. 5). However, the reduction in permeance of $N_2$ is more than in $H_2$ which is reflected in the selectivity to $H_2$; thus, the $H_2/N_2$ ideal perm-selectivity at 1 bar for the humidify membrane is 70 times higher than that without humidification.

Example 3

Water Vapor Pre-Treatment of an Al-CMSM Inside the Permeator

Two carbon molecular sieve membranes were prepared as disclosed in Example 2 but for being carbonized at 550° C. and 600° C. They were referred to as CMSM-550 and CMSM-600, respectively.
3.1 Dry Membrane
CMSM-550 and CMSM-600 membranes were placed inside a permeator. Then, nitrogen was introduced to the permeator and the temperature increased to 150° C. with a heating rate of 2° C./min. The mentioned temperature was kept for 6 hours in order to get the corresponding dehydrated membranes.
After desorbing the water from the pores, the membrane was cooled to the permeation temperature (i.e. 20 to 100° C.) and permeation studies of the dry membrane were performed.

3.2 Humidified Membrane
The dry membranes obtained above were expose to a $N_2$ gas stream saturated with water by bubbling the gas at room temperature into a tank filled with water before feeding to the permeator. To guarantee always the same humidification, the membranes were saturated with water from the humidified stream every night for 12 h before performing the experiments. A nitrogen pure gas permeation test was carried out to confirm that nitrogen permeation at 4 bar pressure was constant.

Example 4

Permeation Studies of the Dry and Humidified Membranes

Figure 6:
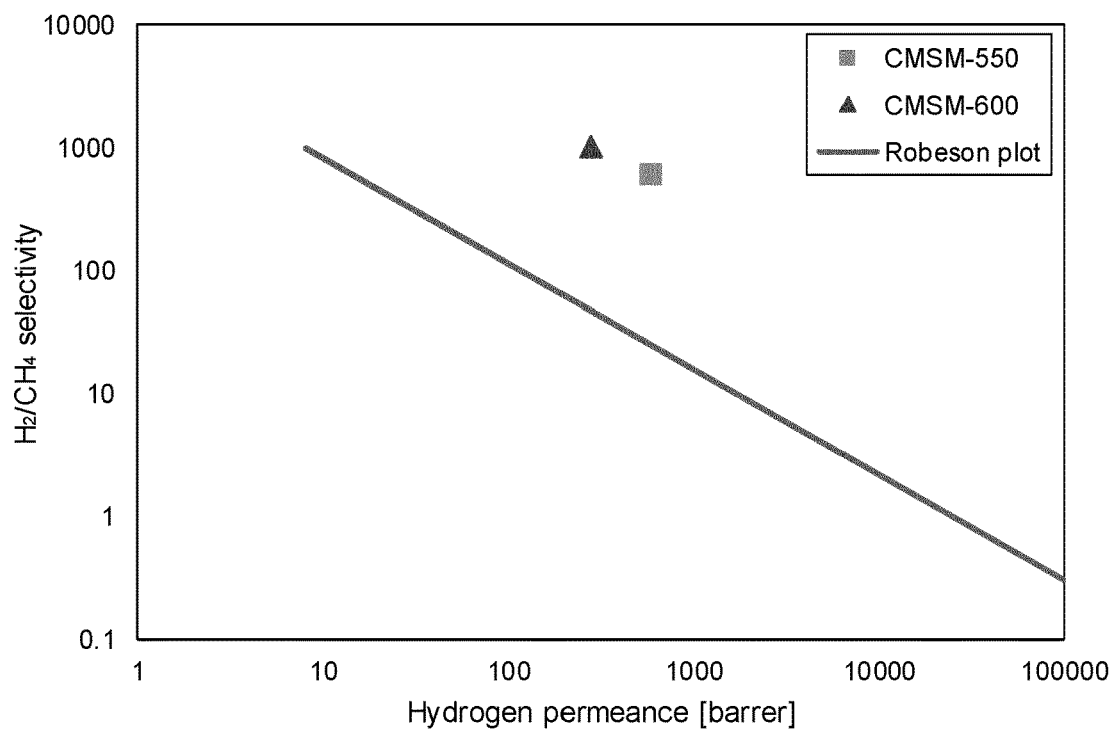
FIG. 6 shows $H_2$ and $CH_4$ permeation results of dry CMSM-550 and CMSM-600 membranes obtained as in Example 3 at 20° C. with the respective Robeson upper bound plot.
Figure 7:
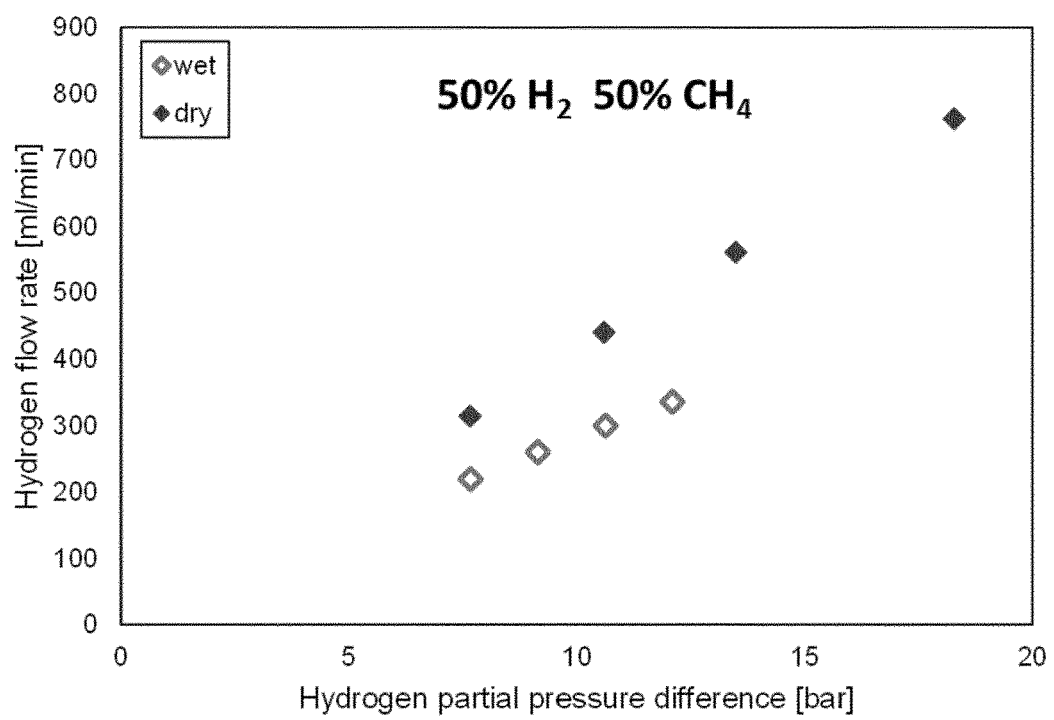
FIG. 7 shows a comparison of the hydrogen flow rate permeation of a 50% $H_2$-50% $CH_4$ mixture using a dry (after water desorption at 150° C.) or a humidified (wet) CMSM-550 membrane. Temperature of permeation: 20° C.
Figure 8:
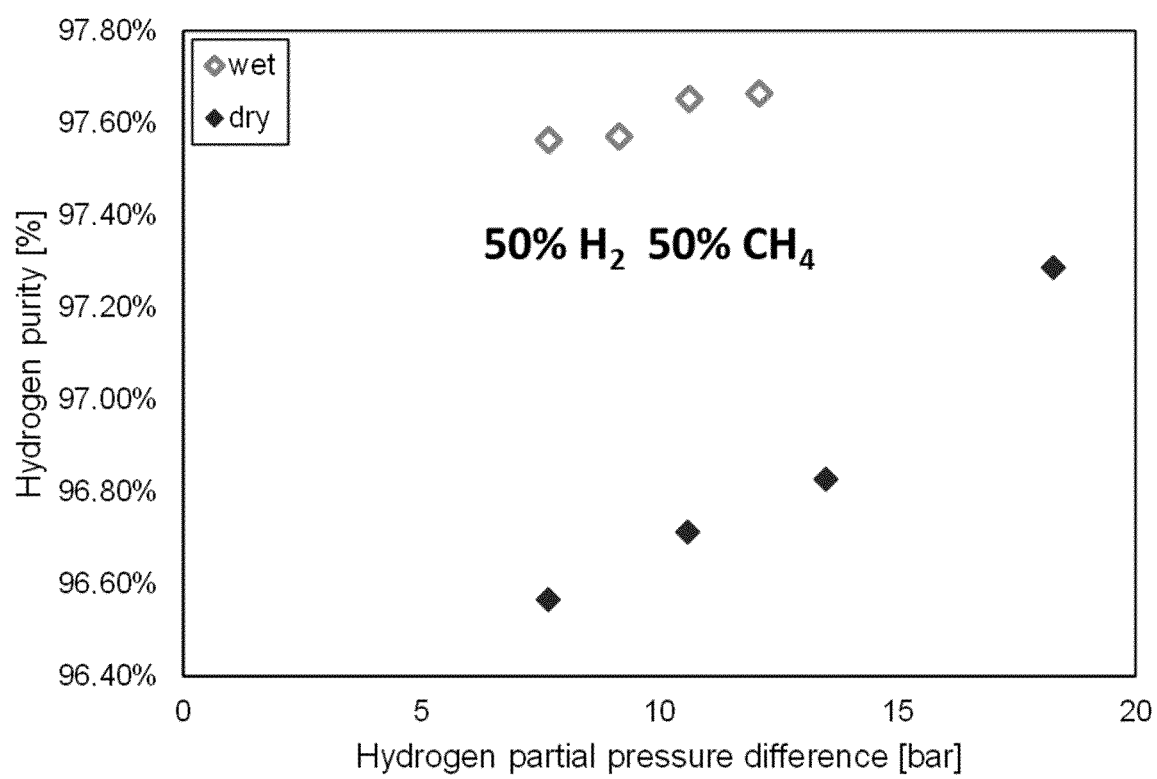
FIG. 8 shows a comparison of the hydrogen purity of the permeate obtained by the permeation of a 50% $H_2$-50% $CH_4$ mixture using a dry (after desorption at 150° C.) and a humidified (wet) CMSM-550 membrane. Temperature of permeation: 20° C.

The permeation of pure hydrogen and mixture of gases containing hydrogen was performed, and the values of hydrogen permeation and purity at various pressures and temperatures were measured. Vacuum was used in the permeate side.
As the humid membrane is concerned, the first interesting result is the excellent selectivity and permeability compared to the Robeson upper bound as it is depicted in FIG. 6. This limit provides a reference to which new membrane materials can be compared.
The differences in the hydrogen flow rate and purity in an Al CMSM carbonized at 550° C. (CMSM-550) before (dry) and after water vapor treatment (humidified) of a gas mixture containing 50% of hydrogen and 50% methane at 20° C. and various hydrogen partial pressure differences are illustrated in FIGS. 7 and 8, respectively. Without wishing to be bound by theory, it is believed that the water treatment makes the walls of the pores wetted with water and, as a consequence, the pore size is reduced (pore filling). The results show that, although the hydrogen flux is decreased (FIG. 7), hydrogen purity is considerably increased (FIG. 8).

Example 5

Permeation of Gas Mixtures Using an Al-CMSM-550 Humidified Membrane

Figure 9:
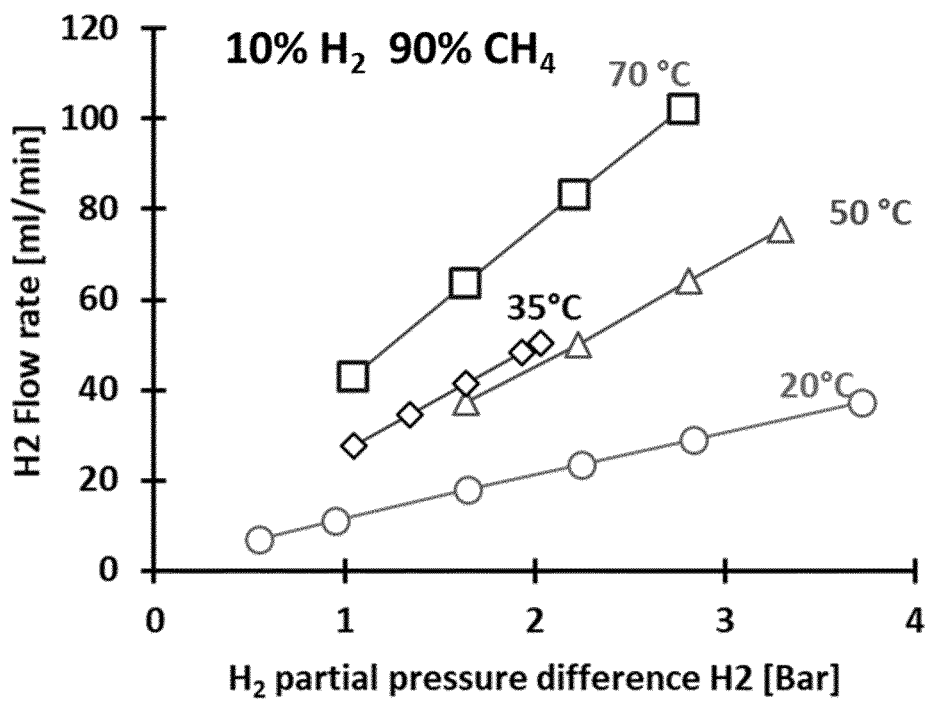
FIG. 9 shows the comparison between the hydrogen flow rates of two $H_2$—$CH_4$ mixtures containing 10% and 50% hydrogen, respectively, at 20° C., 35° C., 50° C. and 70° C., in a humidified CMSM-550 membrane.
Figure 9:
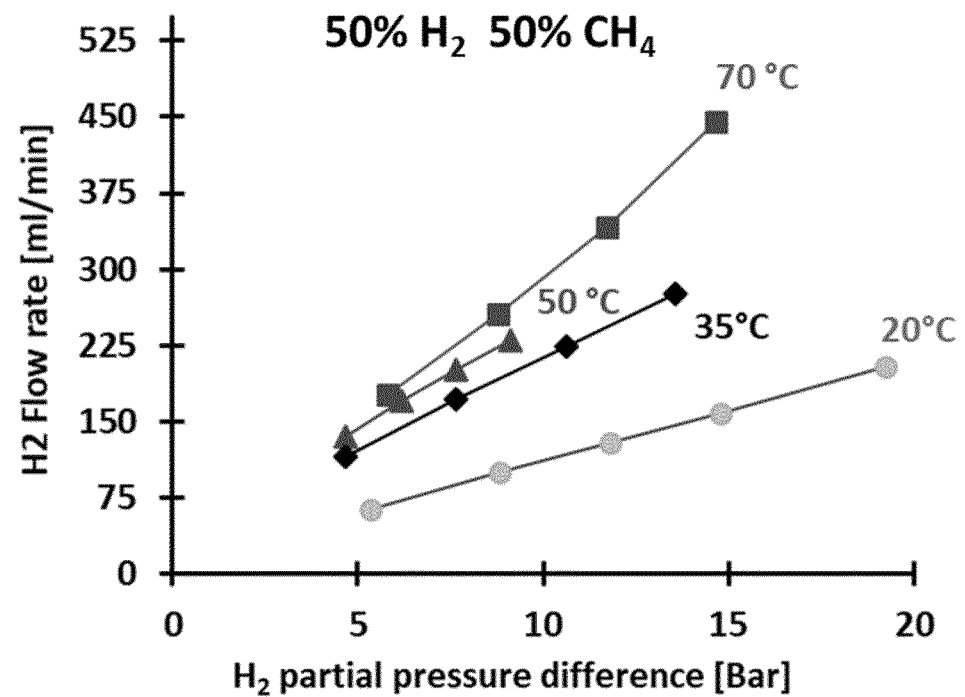
Figure 10:
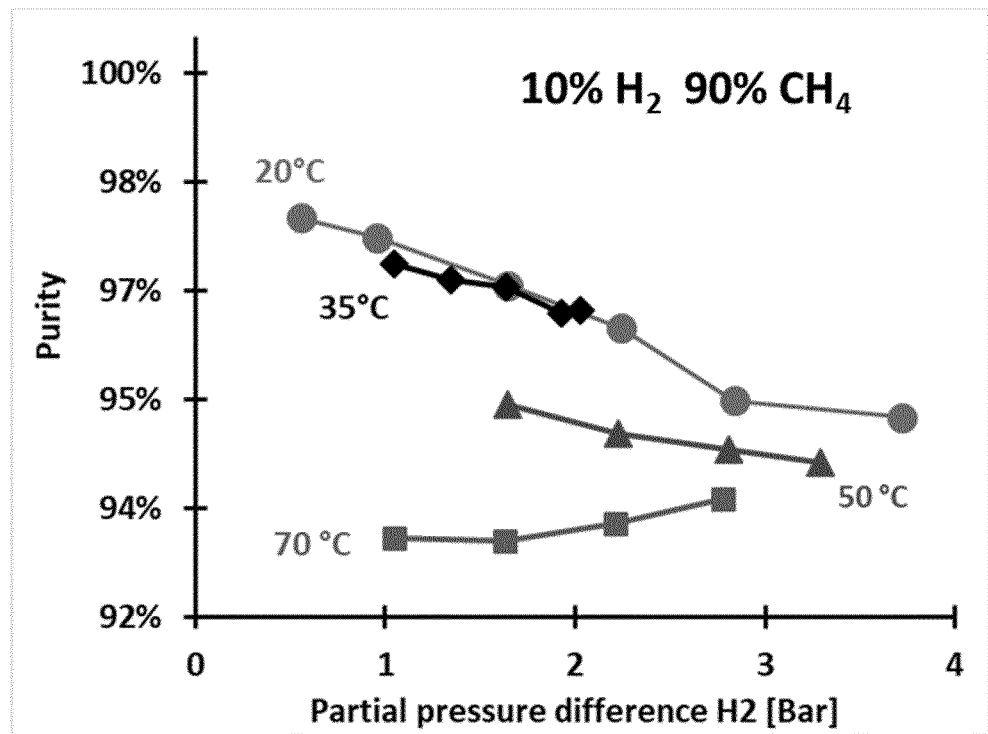
FIG. 10 shows the comparison between the hydrogen purity of the permeate obtained by the permeation of two $H_2$—$CH_4$ mixtures containing 10% and 50% hydrogen, respectively, at 20° C., 35° C., 50° C. and 70° C., using a humidified CMSM-550 membrane.
Figure 10:
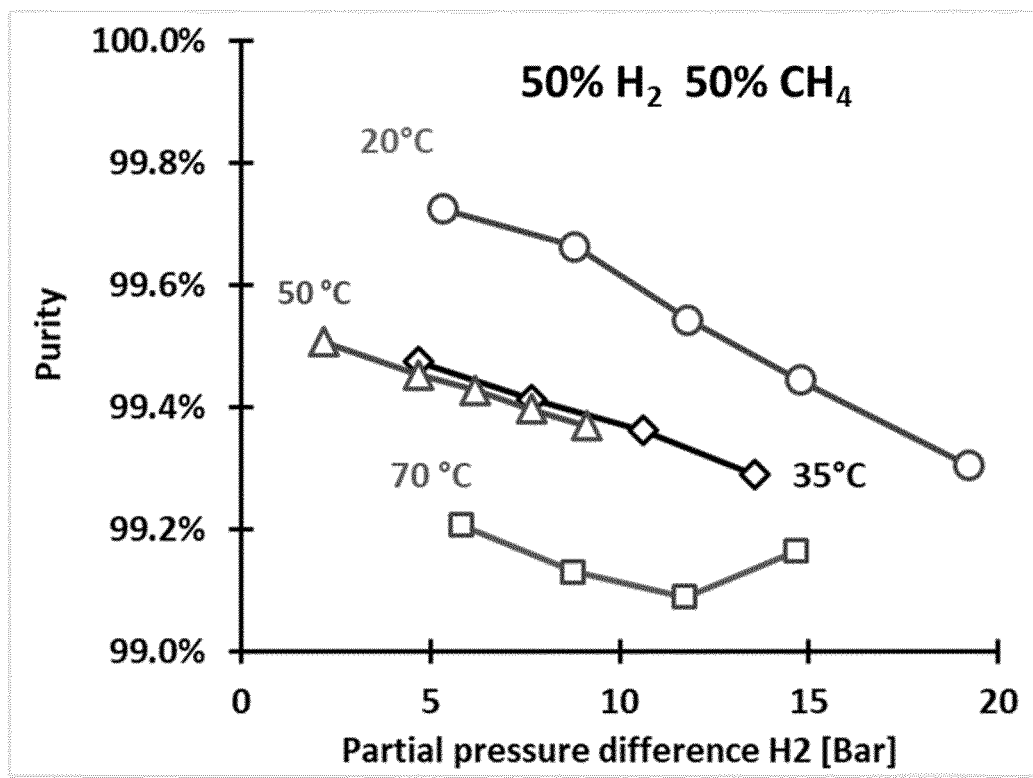

An CMSM-550 was pre-treated with a $N_2$ gas stream saturated with water vapor using the procedure described in Example 3, section 3.2, and was used to measure hydrogen permeation and purity in the permeate from binary mixtures of hydrogen with $CH_4$, $CO_2$ or $N_2$ having 10% or 50% of hydrogen at various temperatures (from 20° C. to 70° C.) and various partial pressure differences, applying vacuum from the permeated side.
The separation of hydrogen present in mixtures with methane containing 10% and 50% hydrogen was studied using the CMSM-550 membrane. Hydrogen flux rate in the permeated obtained from a mixture of $H_2$ and $CH_4$ (10 and 50% of $H_2$) at various temperatures and differences in partial pressure of $H_2$ is shown in FIG. 9, and the correspondent $H_2$ purity is shown in FIG. 10. It can be observed that increasing the permeation temperature the hydrogen permeance raises at the expenses of the hydrogen purity. It is important to underline that for the carbon membrane saturated with water vapor the obtained hydrogen purity is remarkably high especially when a 10% $H_2$ content is considered in the mixture. Thus, particularly, at 20° C. with partial pressure of hydrogen of 0.55 bar a purity of 97.5% is obtained.

Figure 11:
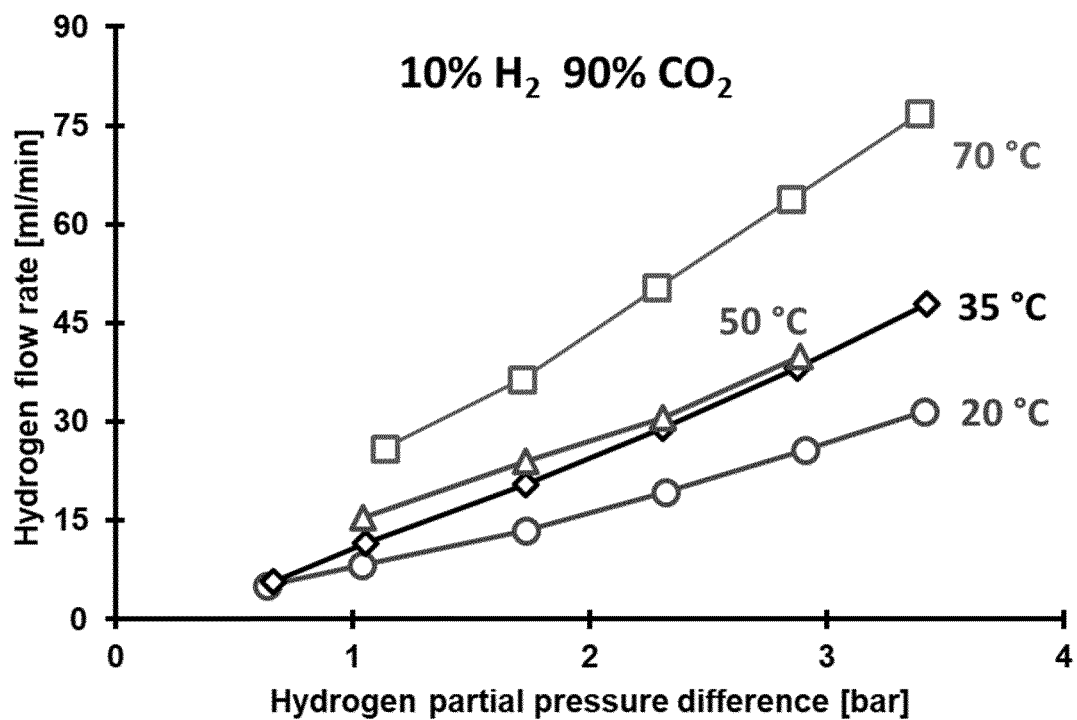
FIG. 11 shows the comparison between permeating hydrogen flow rate of two $H_2$—$CO_2$ mixtures containing 10% and 50% hydrogen, respectively, at 20° C., 35° C., 50° C., in a humidified CMSM-550 membrane.
Figure 11:
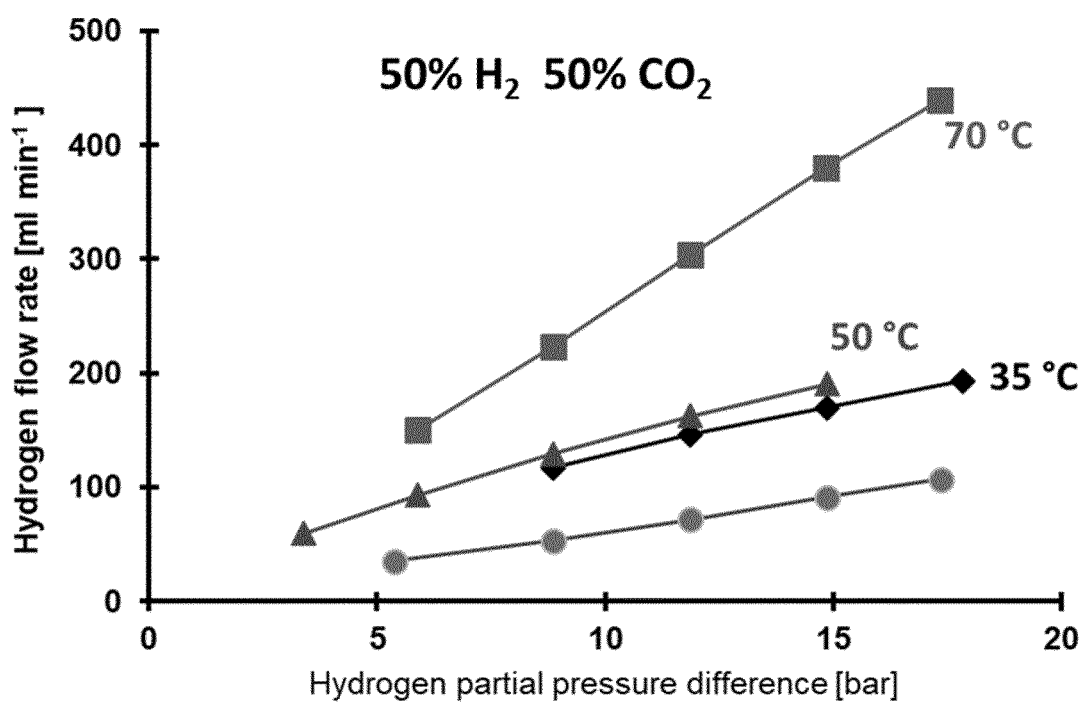

Similar tests were performed with binary mixtures of hydrogen with $N_2$ or with $CO_2$. The results are shown in FIGS. 11 and 12, for $CO_2$ and FIGS. 13 and 14 for $N_2$.

Figure 12:
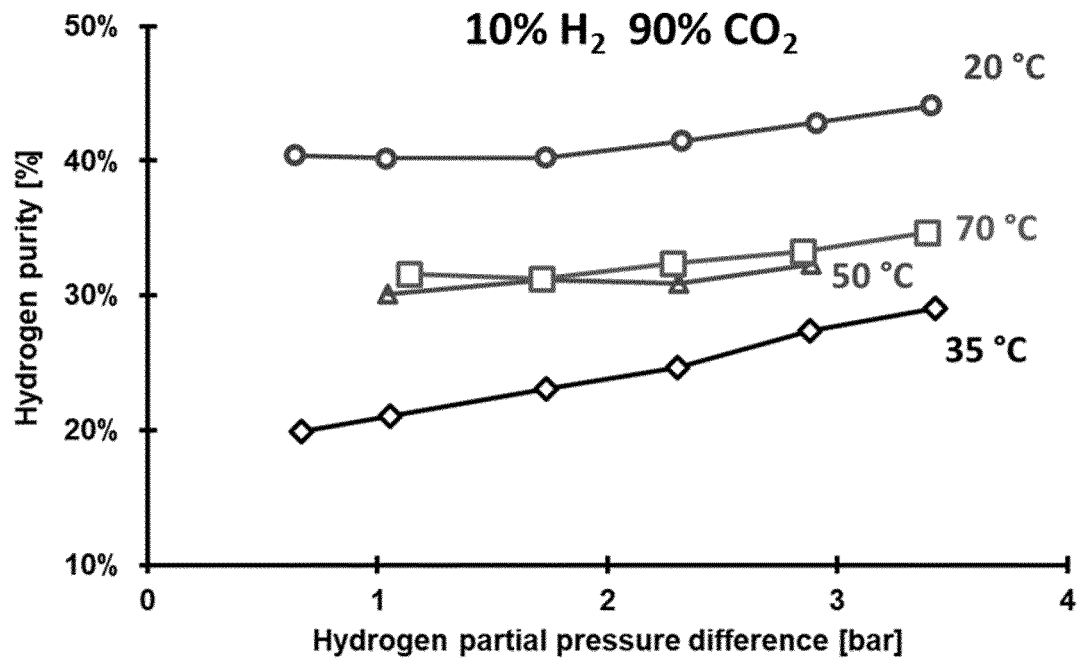
FIG. 12 shows the comparison between hydrogen purity of the permeate obtained by the permeation of two $H_2$—$CO_2$ mixtures containing 10% and 50% hydrogen, respectively, at 20° C., 35° C., 50° C. and 70° C., using a humidify CMSM-550 membrane.
Figure 12:
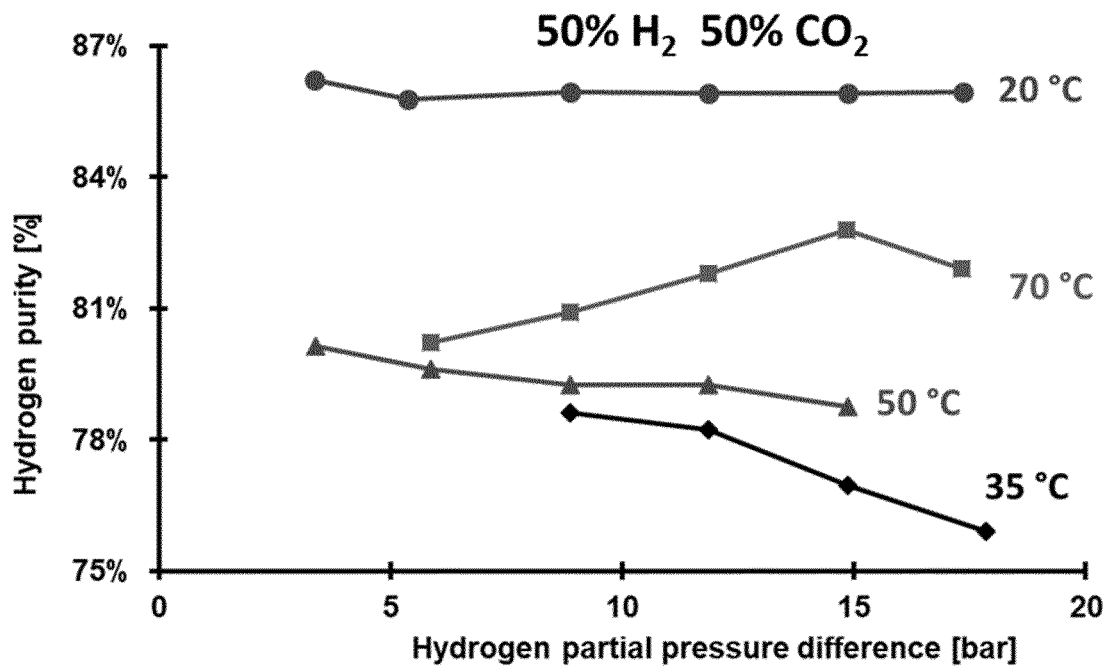

For the separation of $H_2$ from a mixture with $CO_2$, the purity of the permeate is lower than with $CH_4$, probably because $CO_2$ is smaller and more absorbable than $CH_4$ (FIG. 12).

Figure 13:
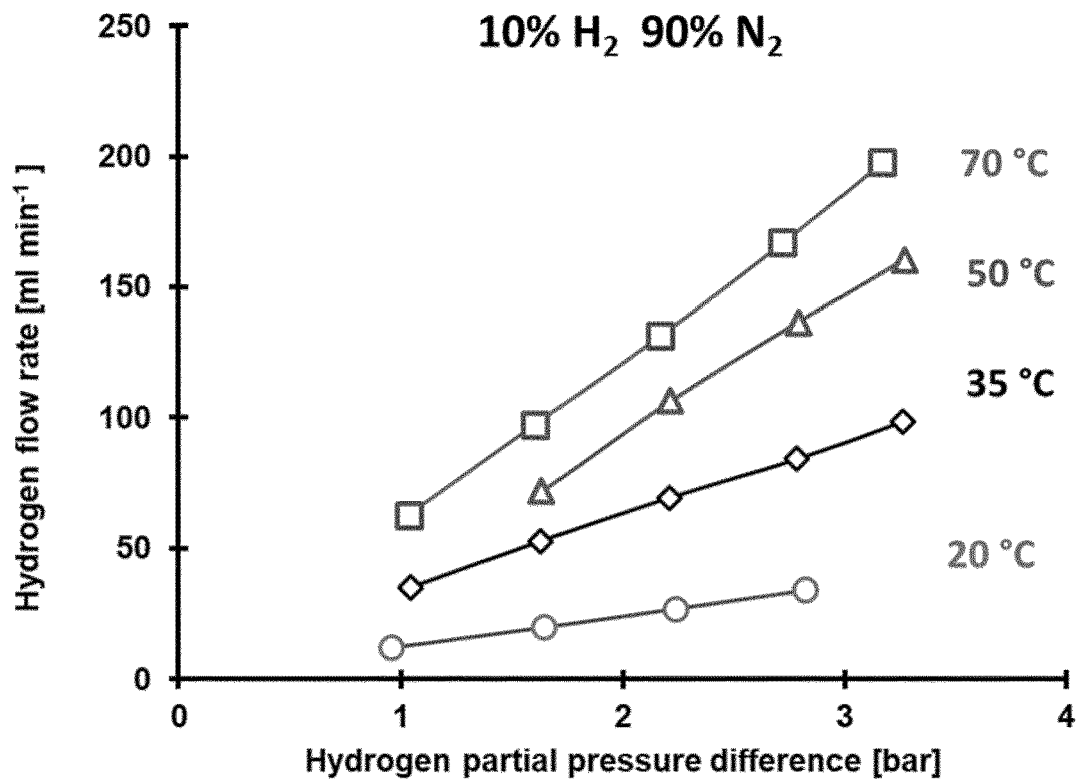
FIG. 13 shows the comparison between the hydrogen flow rate of two $H_2$—$N_2$ mixtures containing 10% and 50% hydrogen, respectively, at 20° C., 35° C., 50° C. and 70° C., in a humidify CMSM-550 membrane.
Figure 13:
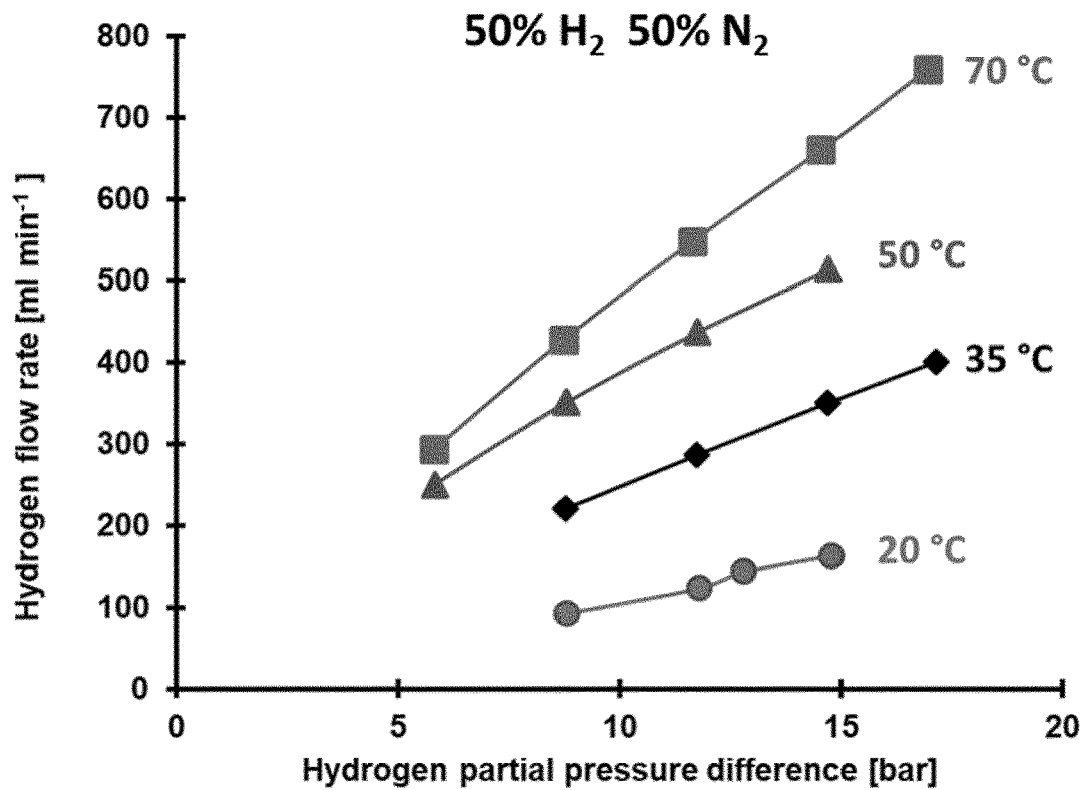
Figure 14:
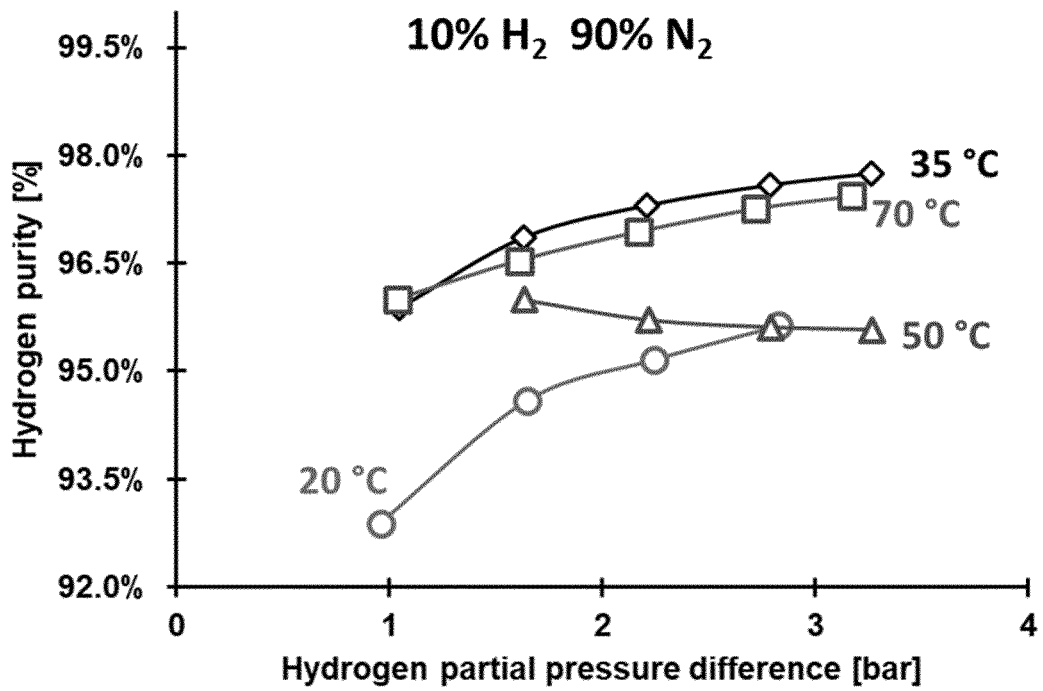
FIG. 14 shows the comparison between hydrogen purity of the permeate obtained by the permeation of two $H_2$—$N_2$ mixtures containing 10% and 50% hydrogen, respectively, at 20° C., 35° C., 50° C. and 70° C., using a humidify CMSM-550 membrane.
Figure 14:
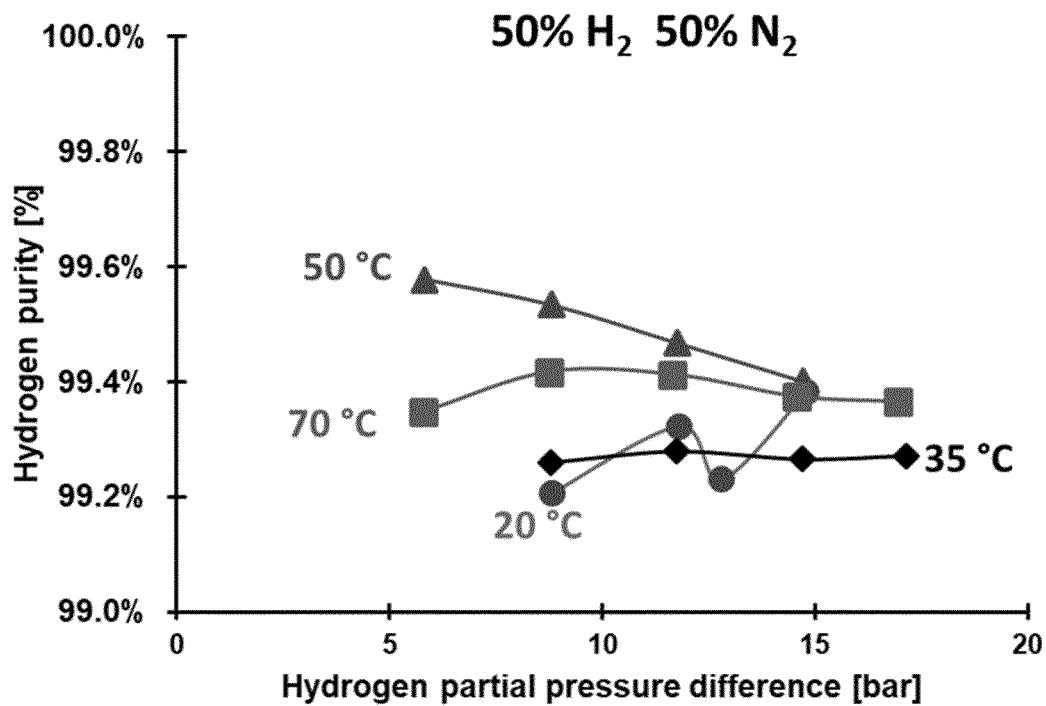

In FIGS. 13 and 14, the $H_2$—$N_2$ results in terms of hydrogen flow rate and purity are depicted at different hydrogen partial pressures differences. When the membrane was saturated with water, high hydrogen purity was reached with all the different considered mixtures. At higher temperatures such as 100° C. a real improvement of performance is expected when the membrane is humidified.

Similar results (to the ones obtained with $H_2/N_2$, $H_2/CH_4$ and $H_2/CO_2$) are expected for gases with a remarkable difference in molecular size or extremely distinct adsorption capacity such as $CO_2/CH_4$ or $CO_2/N_2$. Thanks to their high water adsorption capacity, membranes carbonized from 500° C. to 750° C., particularly from 500° C. to 700° C., will perform in a similar way when tested in humidified conditions under dry gases. High selectivity and purity are expected to be reached up to a working temperature of 100° C. when working with the corresponding humidified membranes.

Thus, similarly, a humidified Al-CMSM carbonized at 500° C. was used to purify hydrogen from a mixture containing 10% $H_2$ and 90% $N_2$. This separation is important because the existing infrastructure of natural gas can be used to store and distribute hydrogen. For safety reasons low concentration of $H_2$ (i.e. 10%) could be mixed; It was observed that purity strongly depended on the temperature of permeation. Particularly, at 30° C. the purity of hydrogen obtained was 99.4%.

Example 6

Differences in the Hydrogen Permeation Properties of a Dry and a Humidified CMSM-600 Membrane A dry CMSM-600 membrane was obtained by heating at 150° C. the membrane under nitrogen environment inside the permeator (most of the water was removed from the pores). Then, the temperature of the permeator was cooled down to 100° C. and the hydrogen permeation of a mixture of 10% $H_2$ and 90% $CH_4$ at various hydrogen partial pressure was performed (100° C. dry-membrane).

Then, the same gas mixture was saturated with water by bubbling in water for 15 h before entering to the permeator which is at 100° C. In this way, water was selectively adsorbed in the hydrophilic (humidified) at 100° C., and the hydrogen permeation was performed (100° C. humidified membrane) at various hydrogen partial pressures. The same procedure was carried out at different temperatures: 70° C., 50° C. and 20° C.

Figure 15:
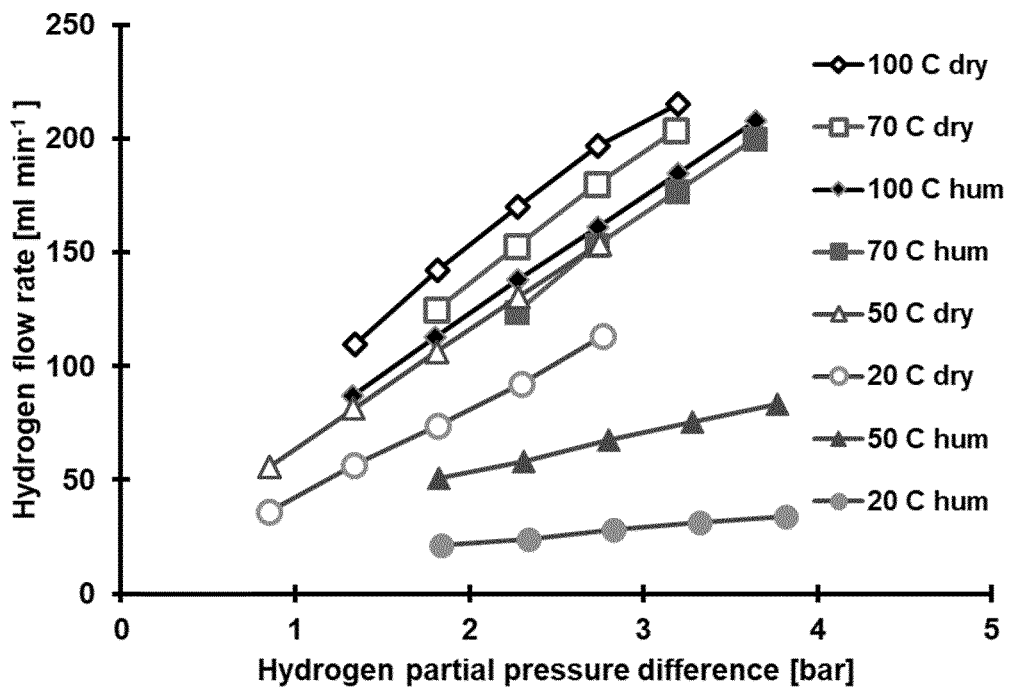
FIG. 15 shows the comparison between hydrogen flow rate in a $H_2$—$CH_4$ mixture containing 10% hydrogen at 20° C., 50° C., 70° C. and 100° C. in a dry and a humidified CMSM-600 membrane.
Figure 16:
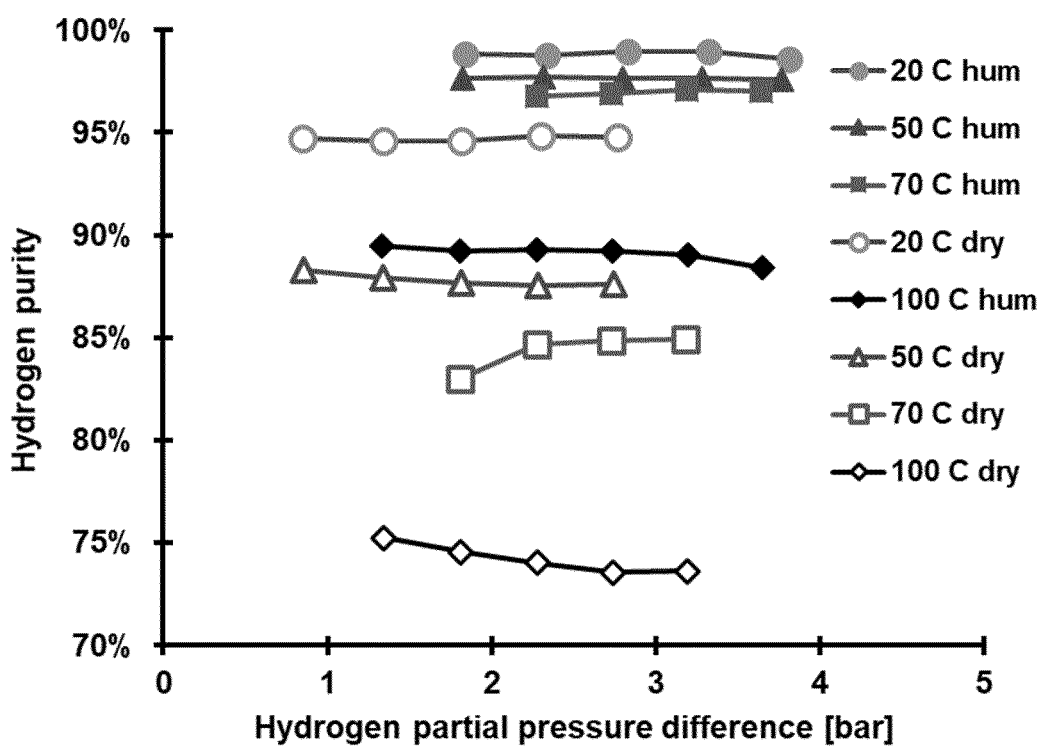
FIG. 16 shows the comparison between hydrogen purity of the permeate obtained by the permeation of a $H_2$—$CH_4$ mixture containing 10% hydrogen at 20° C., 50° C., 70° C. and 100° C. using a dry and humidified CMSM-600 membrane
Figure 17:
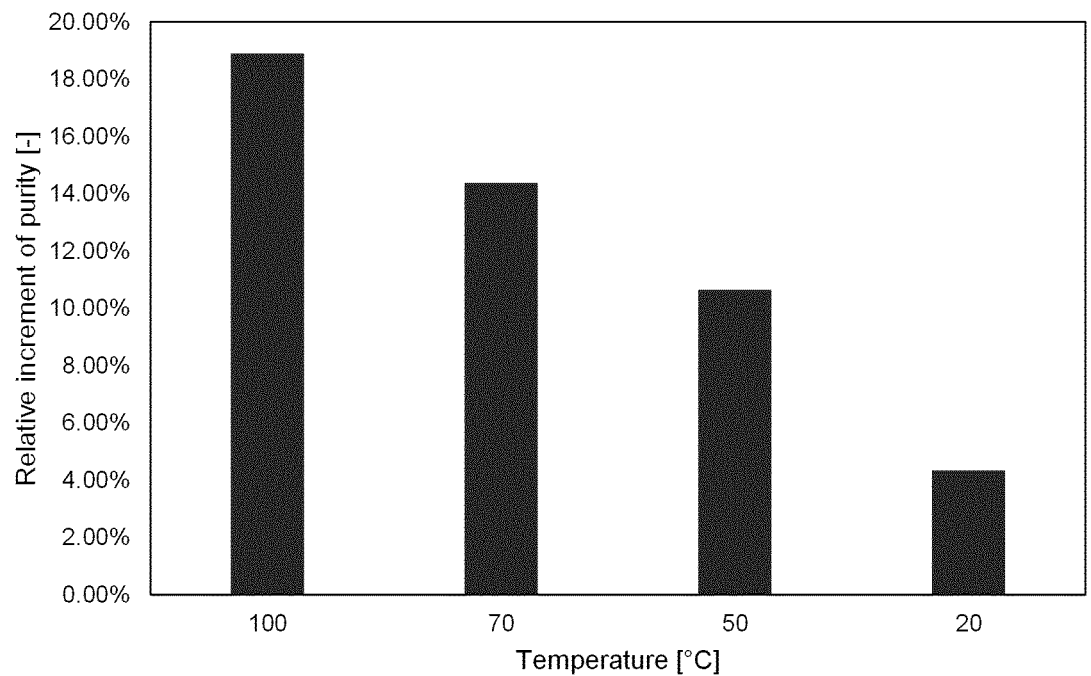
FIG. 17 shows the relative increase in purity obtained in humidified membrane condition.

By humidifying the membrane, the hydrogen flow rate was reduced (FIG. 15), resulting in a remarkable purity increase (FIG. 16). This was more pronounced at higher temperatures. The average increase in purity, which occurs after the membrane was humidified (wet vs dry), was 18% at 100° C., 14% at 70° C., 10% at 50° C. and only 4% at 20° C. (FIG. 17). This indicates that the pre-treatment conditioning the carbon membrane with water vapor stream will be more important at temperatures higher than 100° C.

Thus, according to the results above, humidifying the membrane gives an excellent advantage to the purification especially at higher temperature.

Comparative Example 1

Pd Based Membranes Versus Al-CMSMs

Pd based membranes are used for hydrogen separation due to its high hydrogen permeation and exclusive selectivity. The permeation is carried out preferably at 400° C. because they can be damaged at temperatures below 300° C. and higher than 500° C. In Pd based membranes the hydrogen flux is function of the difference of the square root of the partial pressure difference in both sides of the membrane (Sievert's law). In Al-CMSM the flux is proportional to the difference of partial pressure.

Figure 18:
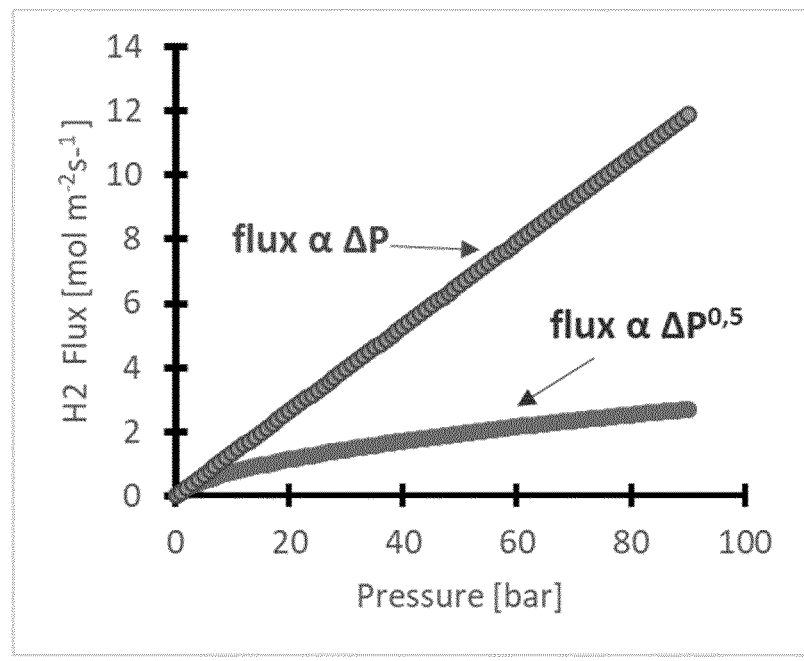
FIG. 18 shows an example of the effect of the flux against the partial pressure difference for a Pd base membrane (flux≈$\Delta P^{0.5}$) and for an Al-CMSM (flux is proportional to $\Delta P$) considering that they have the same permeance (mol·m$^{-2}$ s$^{-1}$·Pa$^{-1}$). at 1 bar pressure.

FIG. 18 shows is an example of the dependence of the pressure against the hydrogen flux for a Pd based membrane and for an Al-CMSM humidified inside the reactor until saturation with water considering that both have the same permeance at 1 bar pressure difference. It can be observed that at low pressures, the flux for both cases is similar. Nevertheless, as the pressure increases the gain in permeation is much higher for Al-CMSMs than for Pd based membranes. At low pressures, $H_2$ permeation for Al-CMSMs is about 10 times lower that for a Pd based membrane with the same thickness; selectivity is also lower for Al-CMSMs (in practical terms 20-40 times lower than for Pd based membranes), nevertheless, the permeation of the Al-CMSM can be carried out at low temperatures (i.e. room temperature) and Pd membranes at high temperatures (usually 400 C).

Comparative Example 2

Figure 19:
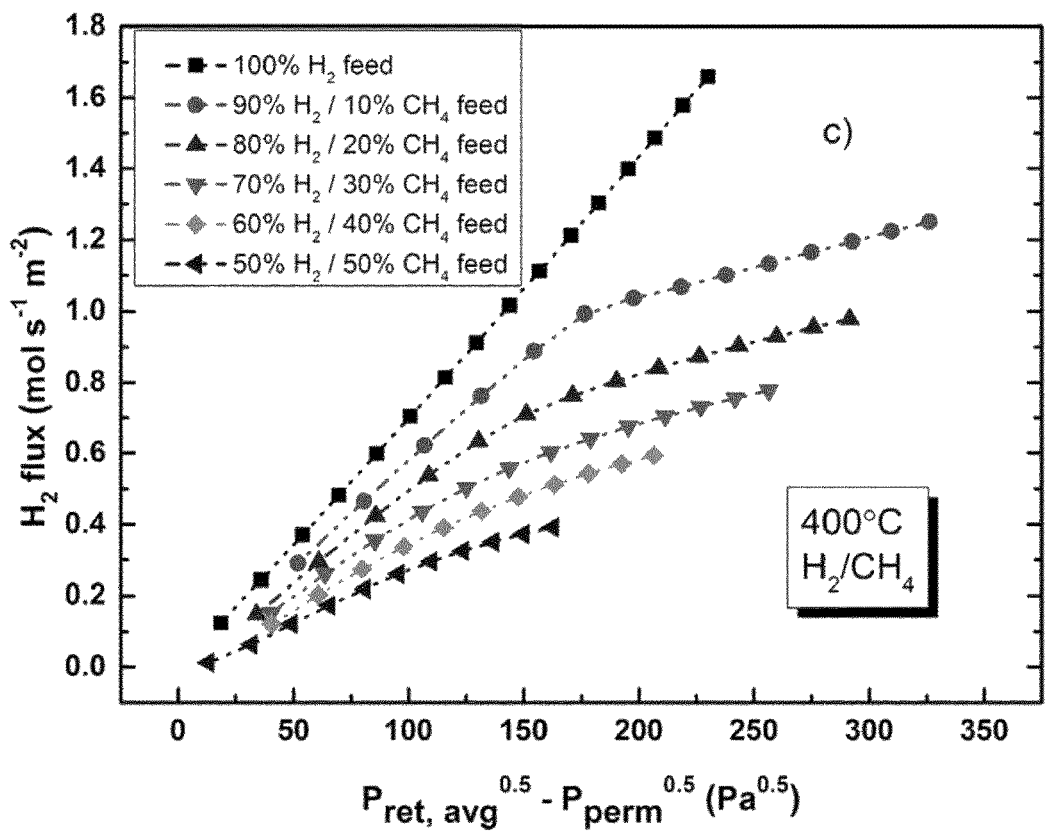
FIG. 19 shows the hydrogen permeated flux for a $H_2/CH_4$ binary mixture at 400° C. from 100-50% of $H_2$ purity in volume as function of the difference of the square root of the partial pressure of $H_2$ in the retentate (as an average) and the permeate side for a PdAg supported membrane.

Effect of the Concentration of Hydrogen in a Mixture with Other Gases on the Hydrogen Permeation In FIG. 19 the hydrogen permeation flux for pure hydrogen and various $H_2/CH_4$ binary mixtures (from 100% to 50% hydrogen) at 400° C. of a 1.29 μm thick PdAg supported membrane in function of the difference of the square root of the partial pressure of hydrogen is depicted (cf. Melendez, J. et al., "Preparation and characterization of ceramic supported ultra-thin (~1 μm) Pd—Ag membranes", *J. Memb. Sci.* 528 (2017), pp. 12-23). Pure hydrogen follows the Sieverts law (linear dependence of $H_2$ flow with the square root of the difference in pressure), but, as the concentration of hydrogen in the binary mixture decreases, the fluxes are not linear showing a downward convexity towards the pressure axis. Since using partial pressure, the effect of the dilution is already included and the fact that $CH_4$ can be considered as inert, the mass transfer limitation from the bulk to the surface of the membrane (concentration polarization) is the most probable explanation of this phenomenon; it becomes more important in case of high flux highly selective membranes. Similar behavior was observed in a Pd 0.8 Ag 0.2; 2.5 μm thick supported membrane.

Figure 20:
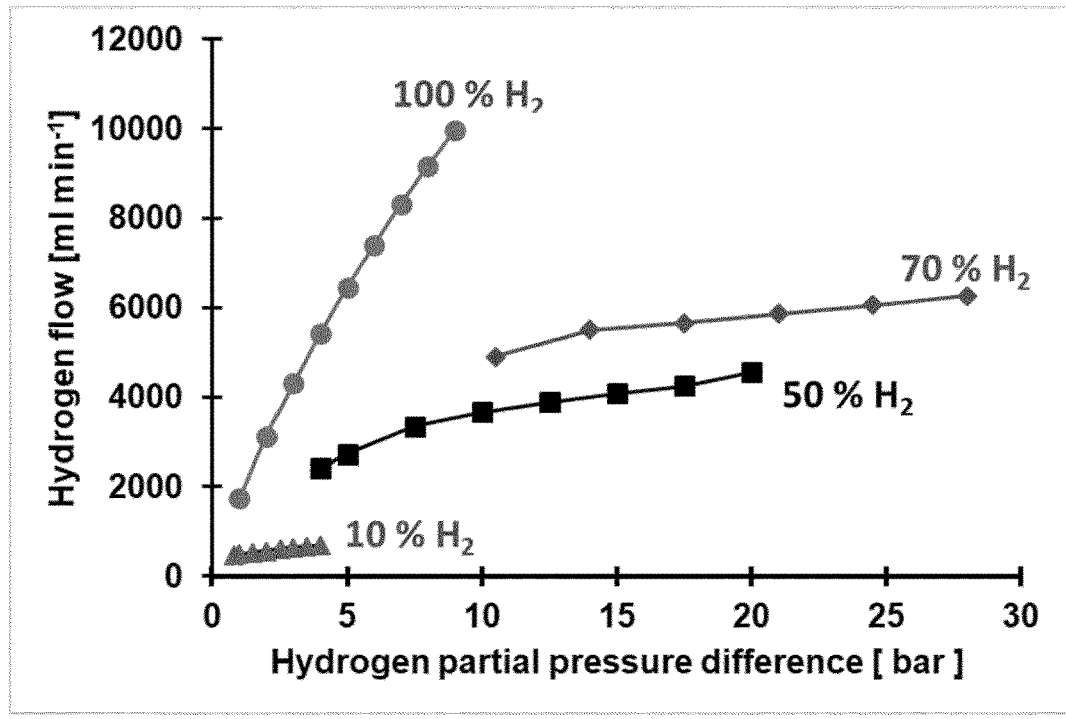
FIG. 20 shows the hydrogen flow rate at different hydrogen concentration in the inlet mixture of $H_2$—$CH_4$ tested at 400° C. for a PdAg supported membrane.
Figure 21:
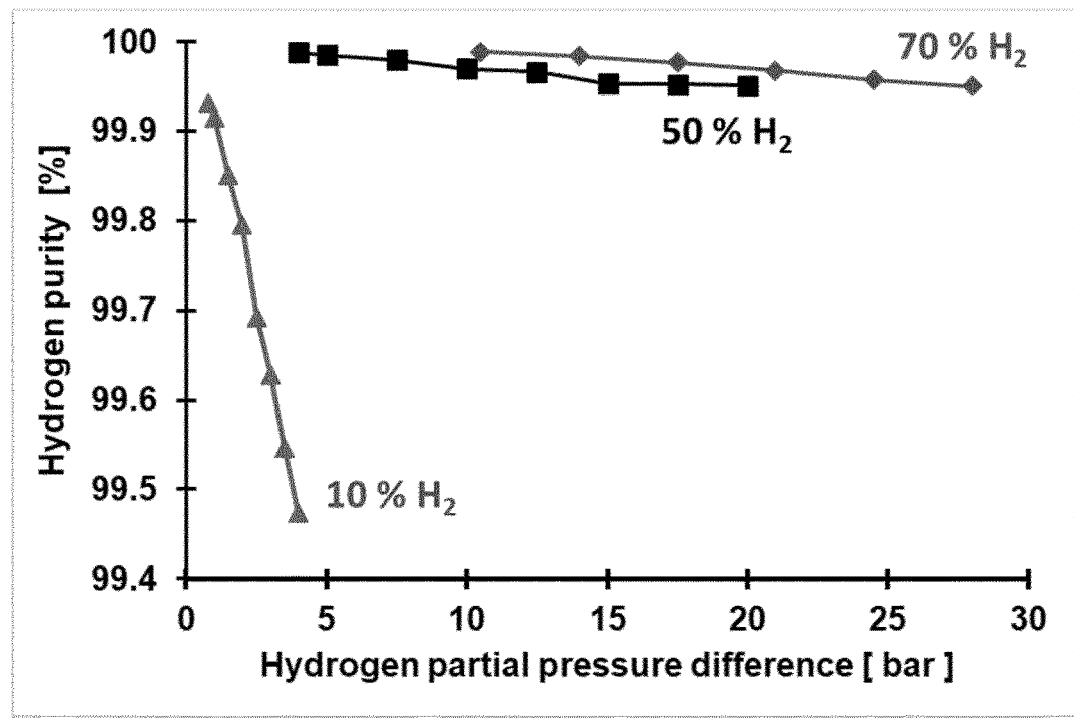
FIG. 21 shows the hydrogen purity at different hydrogen concentration in the inlet mixture of $H_2$—$CH_4$ tested at 400° C. for a PdAg supported membrane.

The results of hydrogen flow rate (FIG. 20) and purity (FIG. 21) for different mixture of $H_2$—$CH_4$ from a hydrogen concentration of 10% to 70% are shown. A Pd—Ag ceramic supported membrane of 20 cm was used for the mentioned tests. The trend was compared as well with pure gas tests. The retentate pressure was changed from 8 to 40 bar while the permeate pressure was kept at 0.15 bar with a vacuum pump. The hydrogen permeance decreased significantly due to concentration polarization especially when working at low hydrogen content. The purity as well was remarkably lower compared to the one obtained with pure $H_2$. The reason was probably the higher contaminant concentration close to the membrane surface due to the high permeation of hydrogen.

Figure 22:
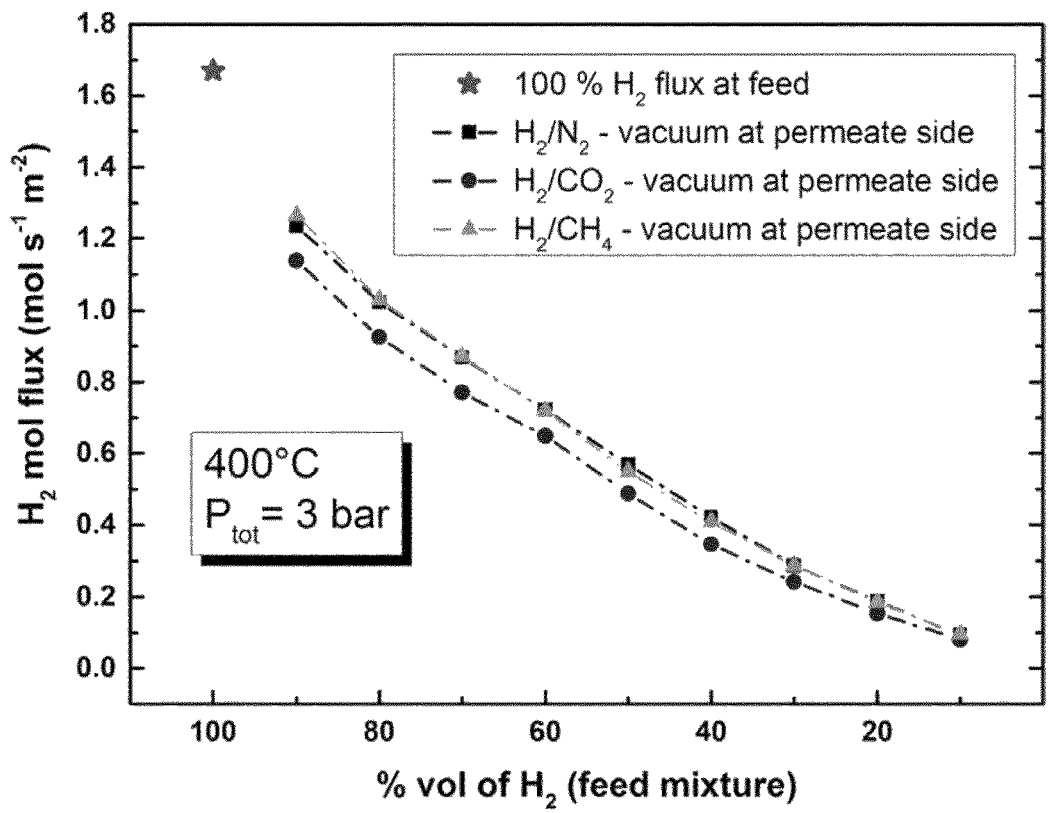
FIG. 22 shows the hydrogen flux as function of the % of hydrogen in the mixture for $H_2/N_2$, $H_2/CO_2$ and $H_2/CH_4$ at 400° C., 3 bar of total pressure and vacuum at the permeate side for a PdAg supported membrane.

In FIG. 22 the hydrogen permeation of binary mixtures of $H_2/N_2$, $H_2/CO_2$ and $H_2/CH_4$ in function of the $H_2$ content in the mixture at 400° C. and 3 bar of total pressure (vacuum in the permeate side) for a PdAg supported membrane is shown (cf. Melendez J. et al. 2017). It is clearly noted that when the hydrogen percentage in the feed decrease, then the hydrogen permeation rate also drops. Moreover, the permeated hydrogen flux decreases quite linearly from 100% to 0% $H_2$ and is quite similar for the different $H_2$ mixtures.

Example 7

Figure 23:
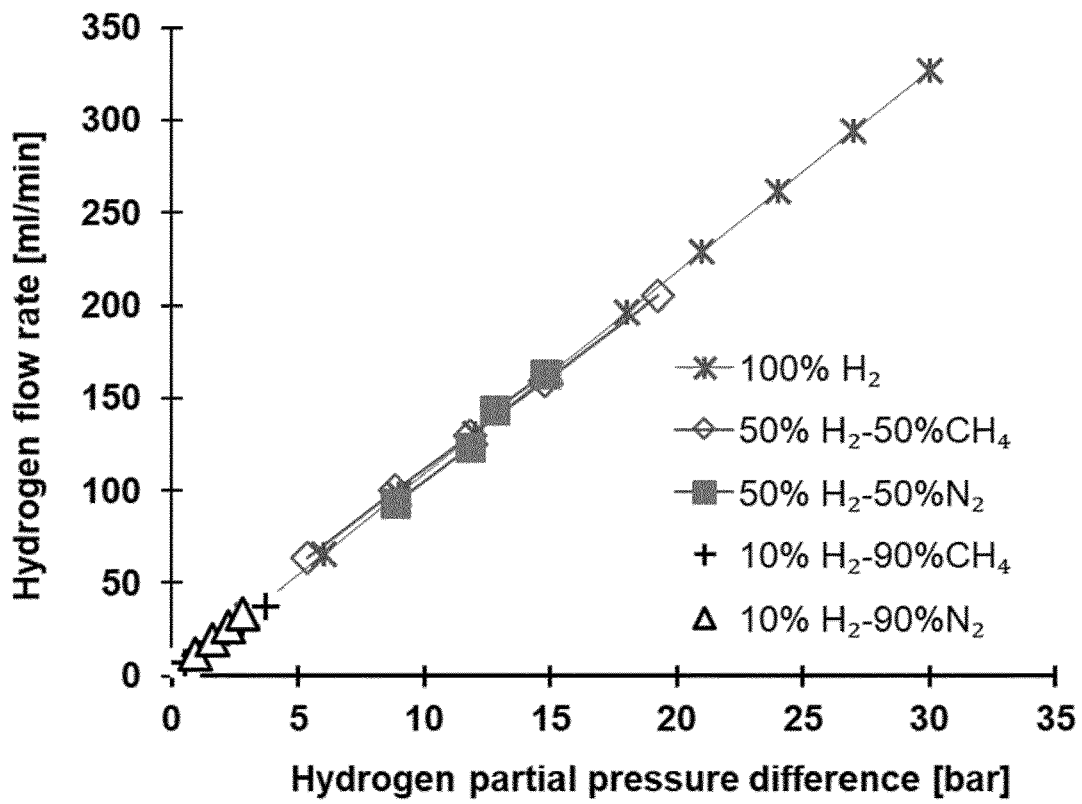
FIG. 23 shows the hydrogen flow rate as a function of hydrogen partial pressure difference for various $H_2/CH_4$ mixtures, at a working temperature of 20° C. when testing CMSM-550 after exposure to ambient humidity.

Dependence of Partial Pressure Difference and Hydrogen Flux in Water-Saturated Al-CMSMs The hydrogen flow rate as a function of the hydrogen partial pressure difference was tested at 20° C. for various $H_2/CH_4$ and $H_2/N_2$ mixtures and an Al-CMSM carbonized at 550° C. (CMSM-550) after exposure to ambient humidity. It was seen that the dependence of the hydrogen partial pressure difference and the hydrogen flux was almost linear, independently of the concentration of $H_2$ in the mixture and the gases tested. (FIG. 23), which proves that concentration polarization does not affect the $H_2$ flow of the membrane.

Results and Advantages of the Water-Saturated Al-CMSMs of the Present Invention

The effect of the water adsorbed a membrane was also tested in an Al-CMSM, carbonized at 600° C. First the water was removed by heating at 150° C. under $N_2$ and permeation test with dry and humidified gas was performed to study the effect of the treatment with water vapor on the purity of the gas permeated. The tests were carried out at various partial pressures of $H_2$, for mixtures of $H_2/CH_4$ containing 10% of $H_2$ at various temperatures (20° C., 50° C., 70° C. and 100° C.) and the relative increase in the purity obtained in humidified conditions was assessed. An evident improvement in performance was shown after humidifying the membranes, especially at high temperatures.

Similar effects are expected with $H_2/CH_4$, $H_2/N_2$, $H_2/CO_2$, $CO_2/CH_4$ and $CO_2/N_2$ gas mixtures thanks to the adsorption of water in the walls of the pores which facilitate the permeation of the more absorbable and smaller molecule.

Thus, water-saturated Al-CMSMs show competitive and promising performance compare to commercial membranes for gas separation in mixture, especially at high pressure because of no mass transfer limitation. Moreover, when working in humidified conditions, further improvement in gas purity is reached thanks to water adsorption, specially at high temperatures.

As seen from the Comparative Examples 1 and 2 and Examples above, water-saturated Al-CMSM of the present invention are advantageous for the following reasons:
- Water-saturated Al-CMSMs provide a significantly higher purities compared to dry Al-CMSMs, especially at higher temperature.
- $H_2$ permeation on Pd membranes is carried out between 300 and 500° C., while in an Al-CMSM can be carried out at room temperature, therefore the operation cost is lower for Al-CMSM considering similar permeation.
- Pd based membranes are very expensive, while the Al-CMSMs are produced from very cheap phenolic resins.
- The flux on Pd membranes depend on the $\Delta P^{0.5}$ while flux on Al-CMSMs depend on $\Delta P$. Therefore, the flux of $H_2$ at high pressures and low temperatures is higher for Al-CMSMs.
- In mix gas permeation, for Pd membranes the flux of hydrogen decreases as the concentration of $H_2$ decreases; for Al-CMSM, the flux is almost constant (not concentration polarization).

Example 8

Carbon Membranes for Water Vapor Permeation

Figure 24:
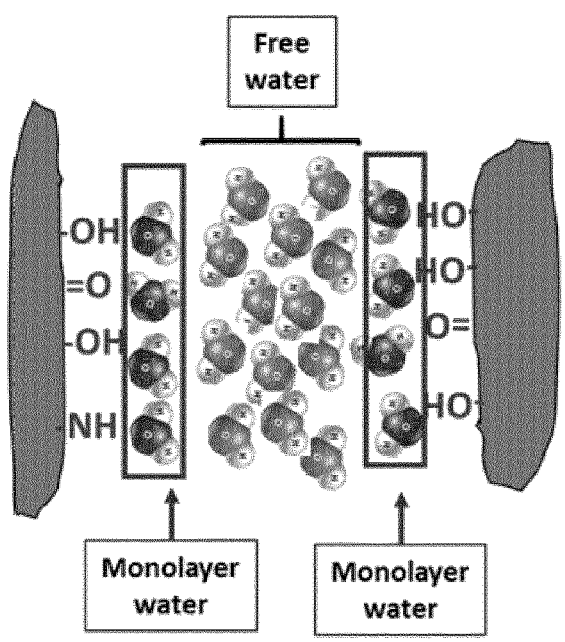
FIG. 24 shows: a) a sketch of a hydrophilic pore filled with water; b) water permeance at various temperatures and pressures of Al-CMSM of Example 2.2 carbonized at 550° C.

In water permeation, depending on the pressure and temperature of water, condensation can occur leading to the presence of both monolayer adsorbed and free water (gas) (FIG. 24). The water in the pores will increase by increasing the pressure and decreasing the temperature.

Effect of the Carbonization Temperature on Water Permeation

Figure 25:
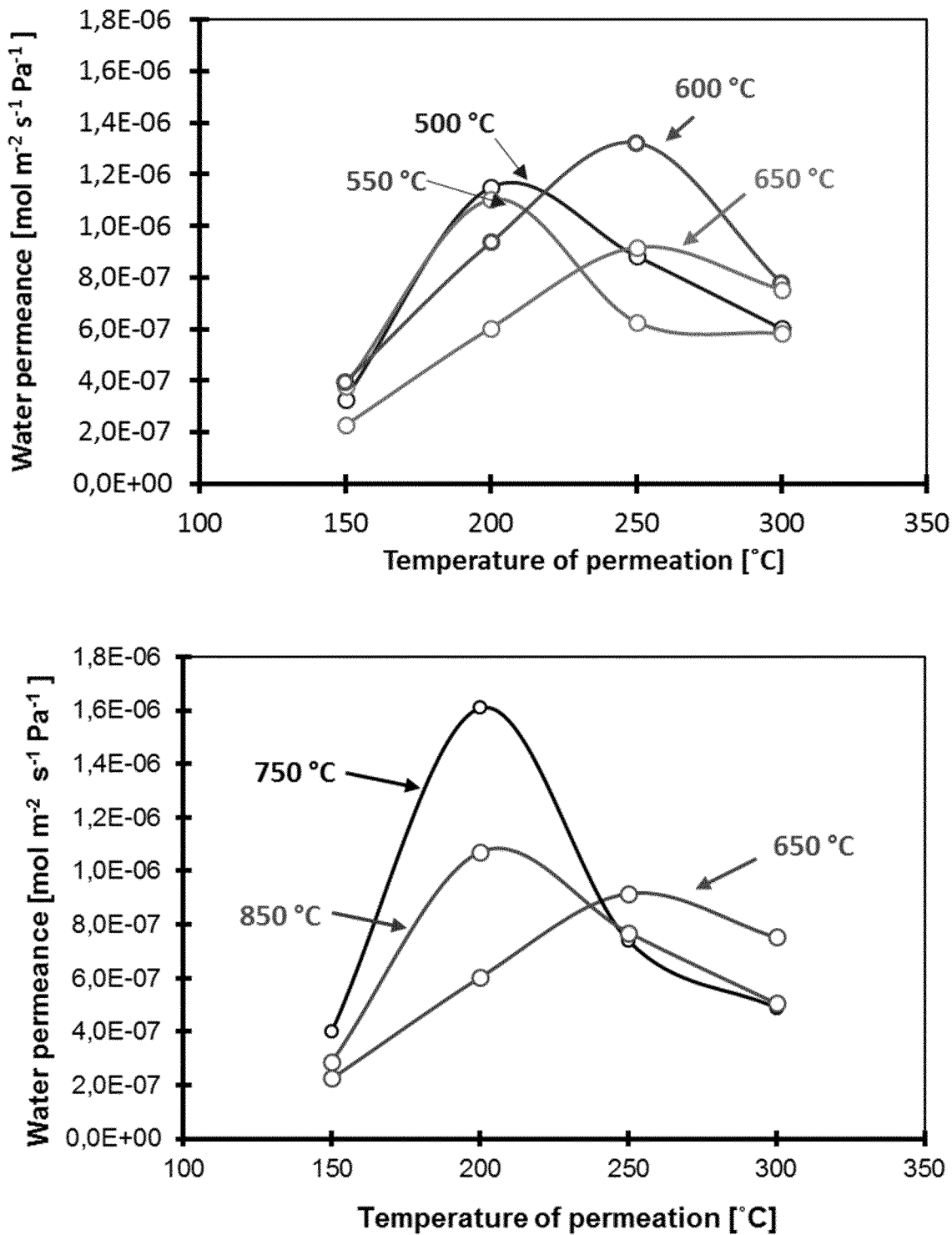
FIG. 25 shows the water permeation at various temperatures and 3 bar of pressure difference for Al-CMSMs of Example 2.2 carbonized at different temperatures.

As discussed above, the hydrophilicity of the carbon membrane can be modified by changing the carbonization temperature. Water permeance at different temperatures and a pressure difference of 3 bar was measured for the Al-CMSMs of Example 2.2 and is shown in FIG. 25. Independently from the carbonization temperature, the lowest permeances were obtained when the experiments were carried out at 150° C.; as explained before, this is due to the condensation of water in the pores. For the membranes carbonized at 500 and 550° C. the highest permeances were obtained at permeation temperature of 200° C.; for membranes carbonized at 600 and 650° C. the maximum shifted to 250° C. (FIG. 25). When the temperature of carbonization of the membranes was increased to 750 and 850° C., the peak of permeance shifted again to 200° C.

The permeation peaks were related to the hydrophilicity of the pores. Without wishing to be bound by theory, it is though that as the carbonization of temperature increases from 550 to 600° C., the number and size of pores increase exposing more hydrophilic groups; the number of active carbons also increase which will react with water forming new hydrophilic groups. Increasing the temperature from 650° C., hydrophilic groups are being removed, and condensation reactions between active carbons occurs reducing the porosity of the membrane and consequently the water permeation. This is more pronounced for the membrane carbonized at 850° C.; therefore, the water permeance at this temperature is lower than that at 750° C. The presence of more hydrophilic groups in the pores allows water to be more strongly bonded to the pores which requires more energy (higher temperature) to be removed.

Water/Gas Ideal Perm-Selectivity.

Figure 26:
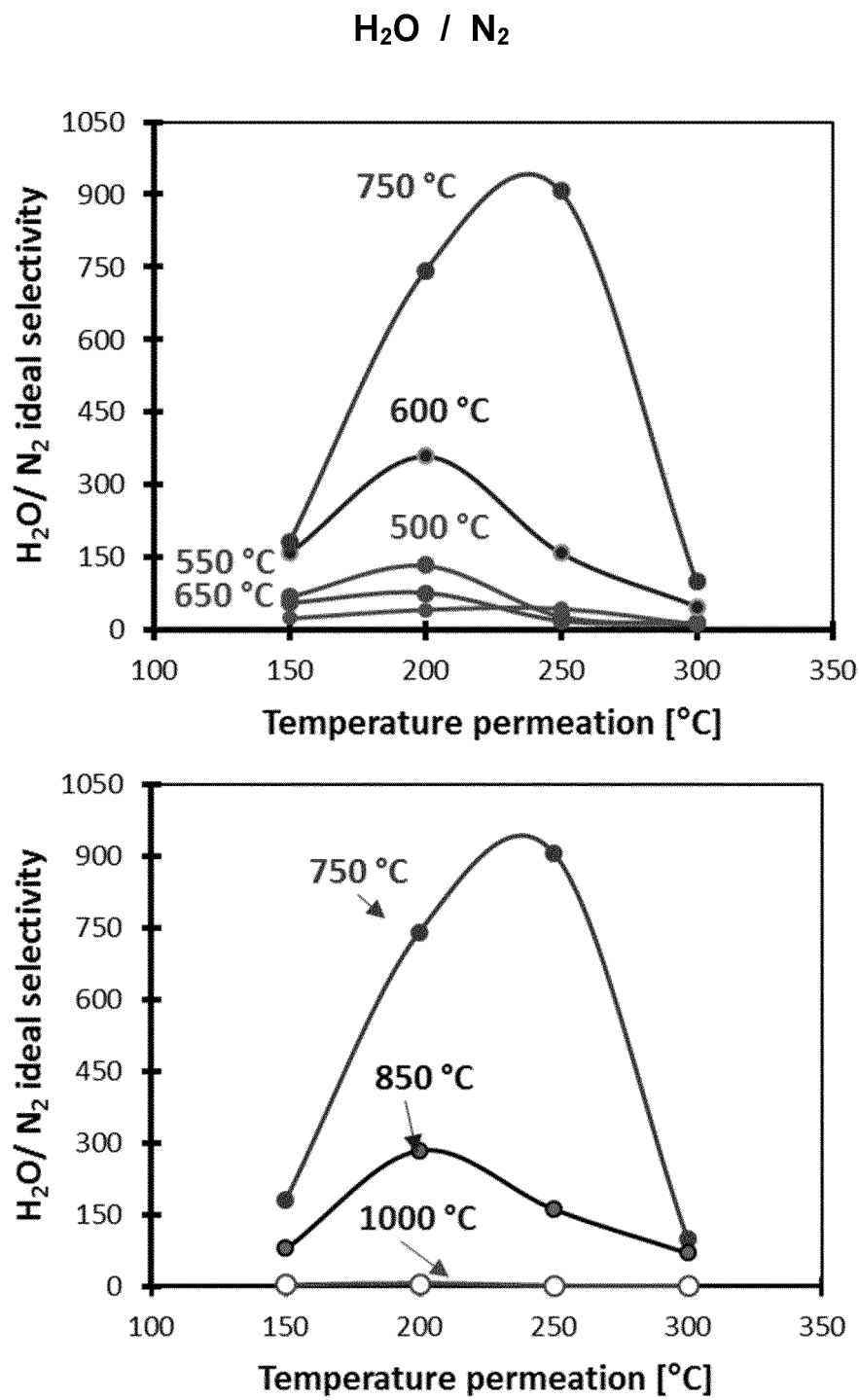
FIG. 26 shows the water gas selectivity against various gases in function of the permeation temperature of Al-CMSMs of Example 2.2 carbonized at different temperatures.
Figure 26:
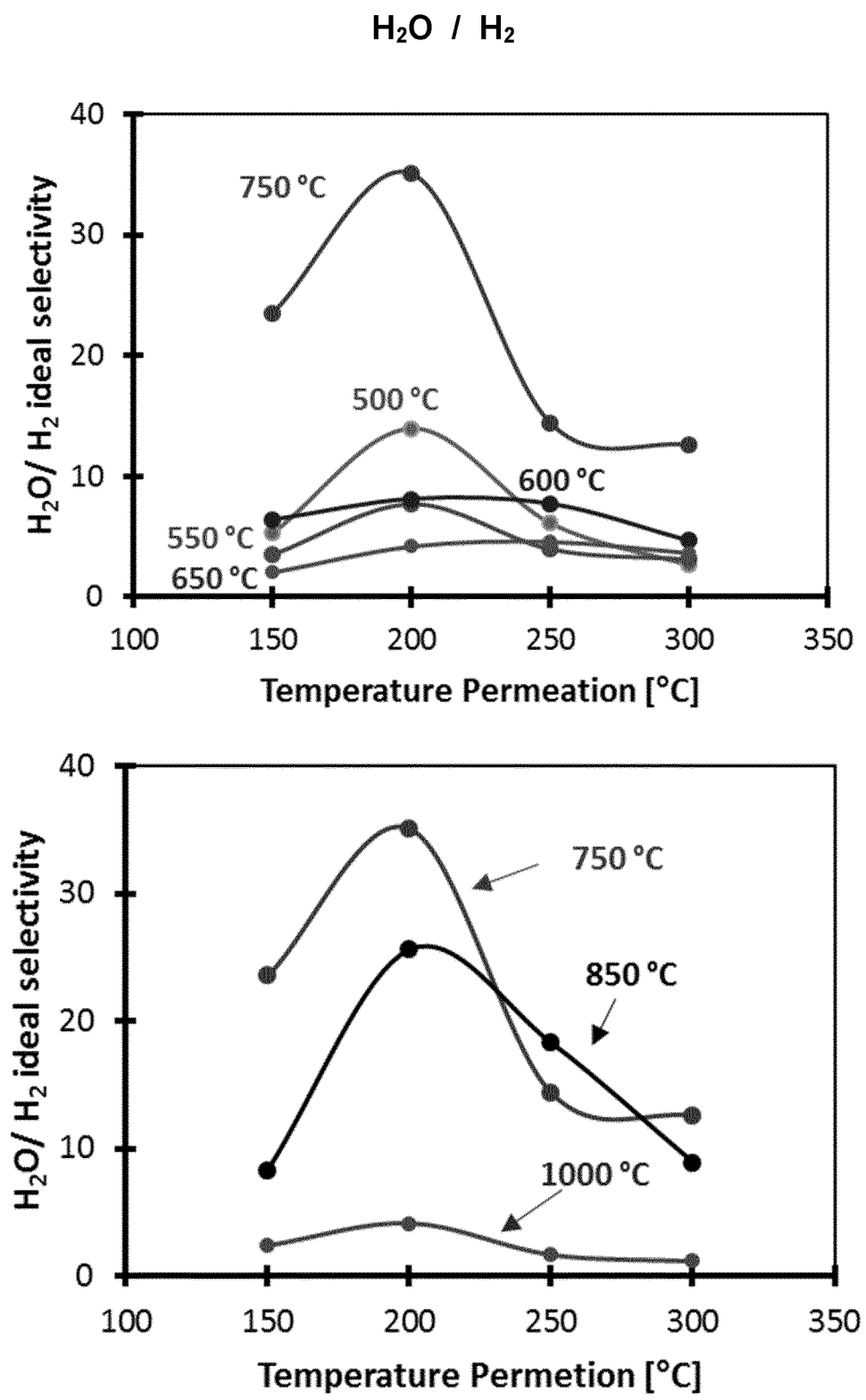
Figure 26:
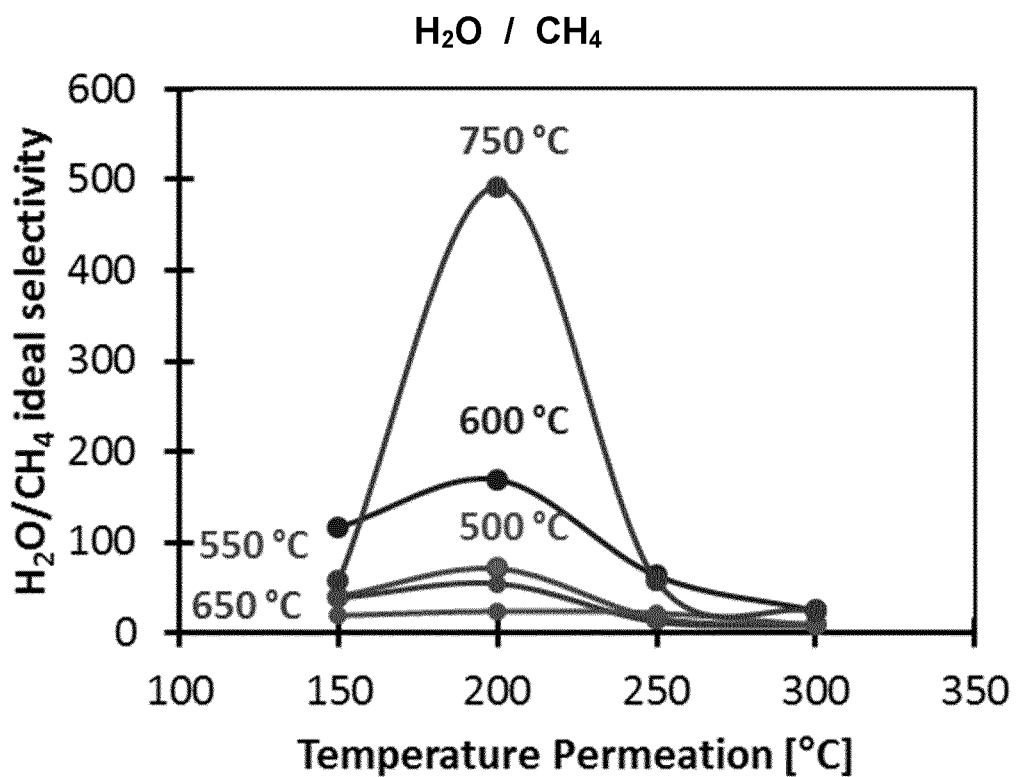
Figure 26:
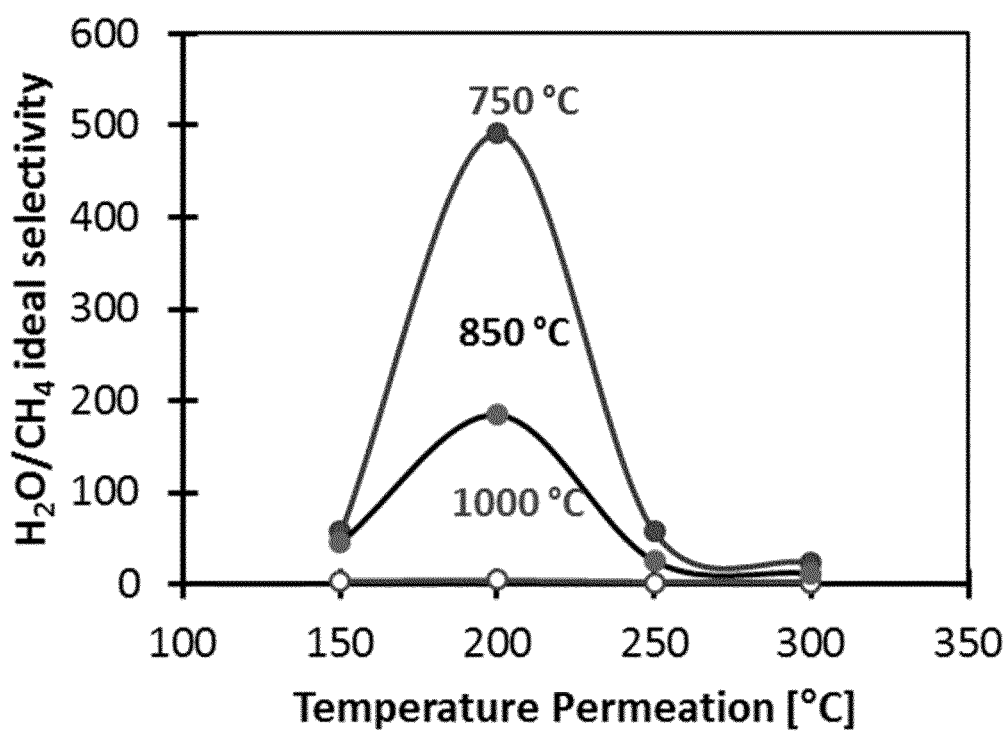
Figure 26:
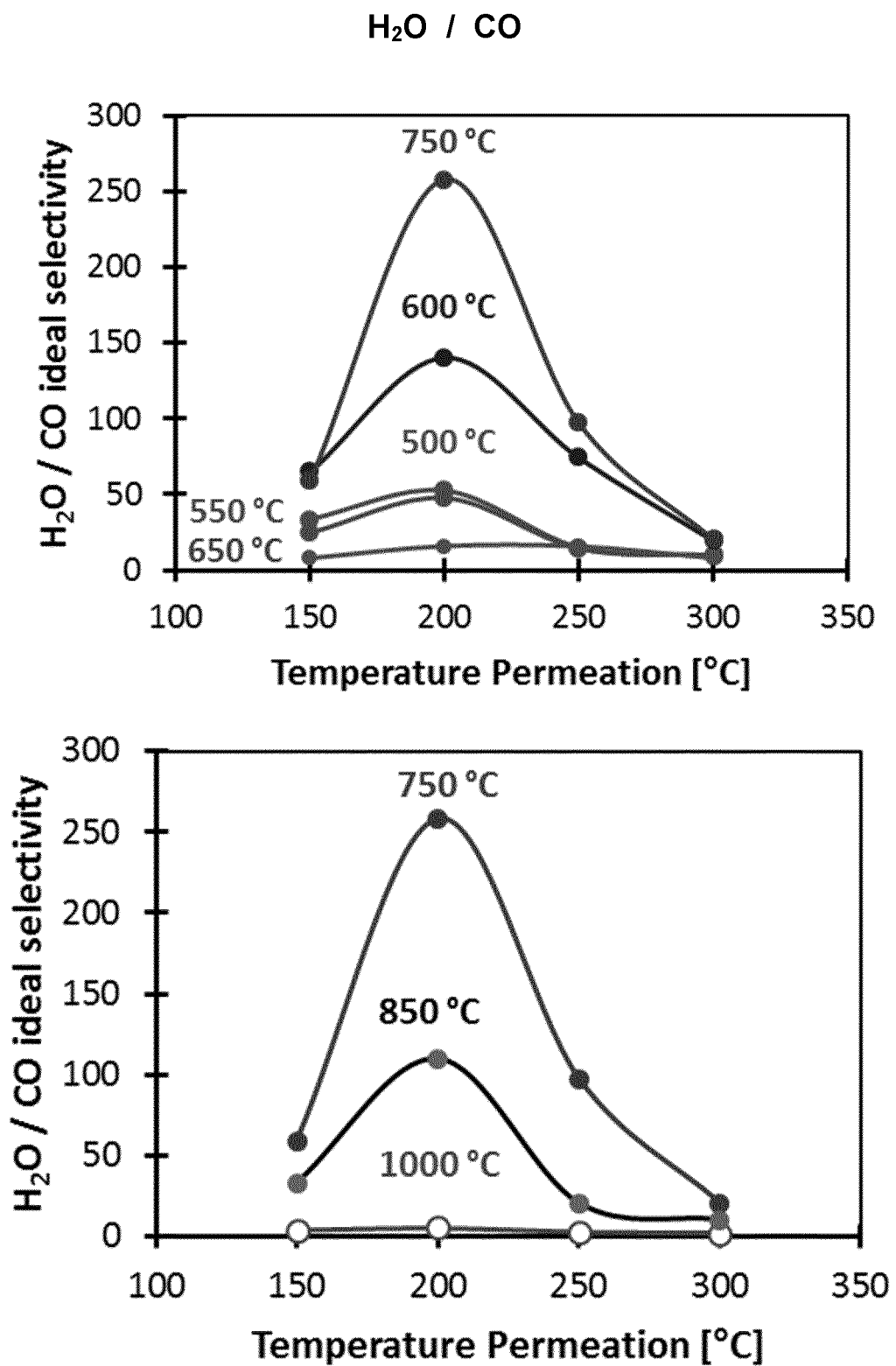
Figure 26:
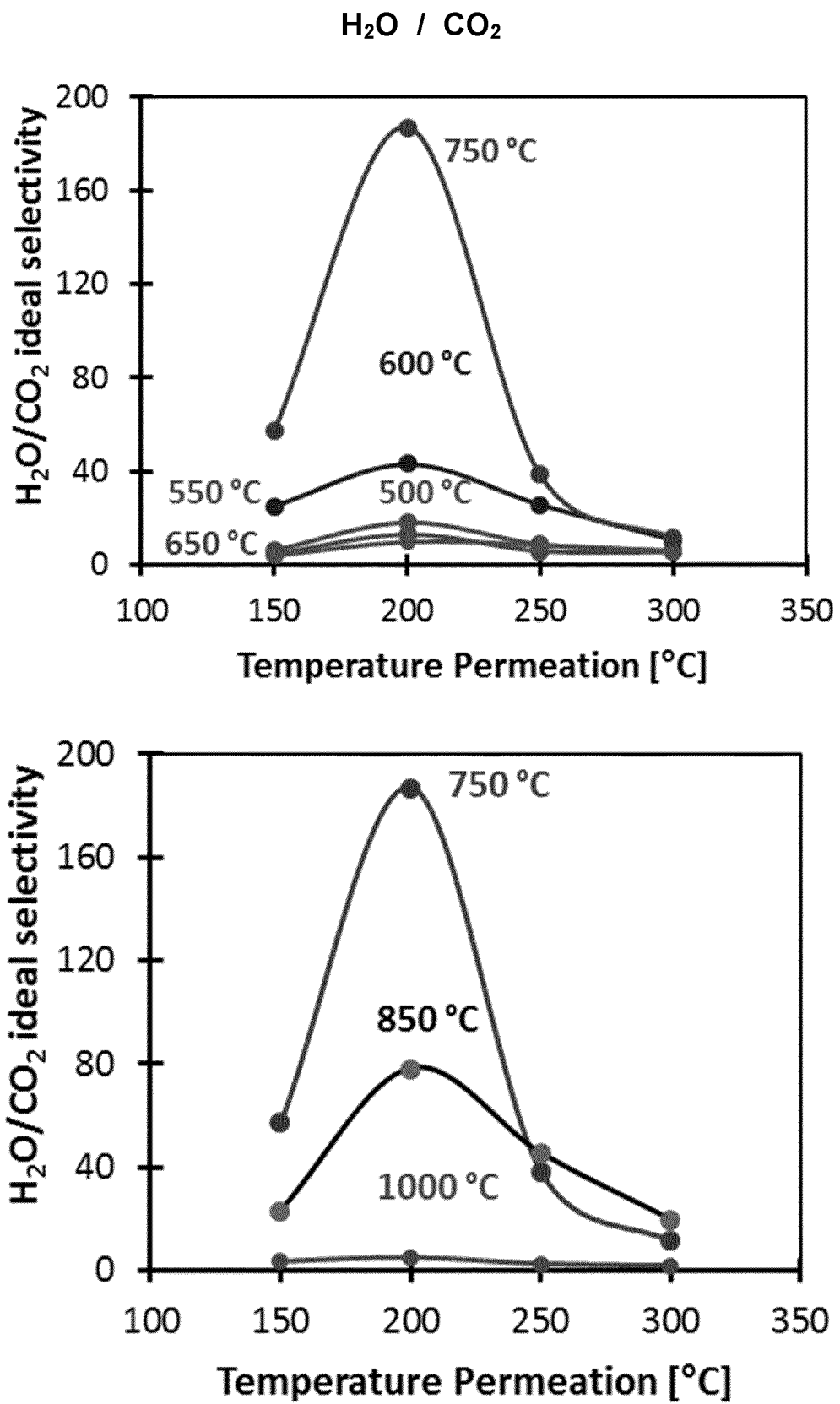

The permeance of various gases ($N_2$, $H_2$, $CH_4$, CO. $CO_2$) at different temperatures was measured for the Al-CMSMs of Example 2.2, and their water/gas ideal selectivity (i.e water perm-selectivity) was calculated. The results are illustrated in FIG. 26. For the gases tested, all the membranes showed selectivity towards water since it has the smallest kinetic diameter (0.26 nm, molecular sieving transport and has more affinity to the pores (adsorption diffusion transport).

Water perm-selectivity depends on the temperature of carbonization and the temperature of permeation.

Independently of the carbonization temperature, the highest selectivities were obtained when the permeations were carried out at around 200° C., the exception being for the mixture $H_2O/N_2$, where the maximum was obtained at around 250° C. for the membrane carbonized at 750° C. Probably, at around that carbonization temperature, the number and size of the pores are the best for the permeation of water; below that temperature, the pores are fewer, and above, the water start to condensate in the pores reducing the porosity, the hydrophilicity and pore size. In fact, the lowest selectivities are obtained with the membrane carbonized at 1000° C.

In general, for the gases tested, the highest selectivities are obtained with the membrane carbonized at 750° C.

Water/gas ideal selectivities in function of the kinetic diameter and the temperature of permeation of Al-CMSMs of Example 2.2 carbonized at different temperatures are shown in FIG. 26. For all the carbonization temperatures, the highest selectivities are obtained for water/$N_2$. Water selectivity against $CO_2$ and $H_2$ are lower than $N_2$, probably due to the bigger kinetic diameter of the later. CO being bigger than $N_2$ has lower selectivity. CO is a polar compound that can be adsorbed on the hydrophilic pores of the carbon membrane what increase the adsorption diffusion mechanism of permeation. Comparing CO and $CH_4$, $CH_4$ is bigger than CO, therefore, its permeation is lower. Concerning to $N_2$ and $CH_4$, $CH_4$ is a symmetrical molecule which cannot be easily polarizable, in the other hand, $N_2$ is less symmetrical and can be more easily polarizable increasing the dipole-induced dipole interaction with the polar pores.

The lowest selectivity is observed with $H_2$, as the size of the molecule is slightly bigger than water; in addition, water can form hydrogen bonds with the pores increasing the adsorption diffusion permeation.

CITATION LIST

1. Llosa M A et al. "Composite-alumina-carbon molecular sieve membranes prepared from novolac resin and boehmite. Part I: Preparation, characterization and gas permeation studies", *Int. J. Hydrogen Energy.* 2015, vol. 40, pp. 5653-5663.
2. M. A. Llosa et al. "Composite-alumina-carbon molecular sieve membranes prepared from novolac resin and boehmite. Part II: Effect of the carbonization temperature on the gas permeation properties", *Int. J. Hydrogen Energy.* 2015, Vol. 40, pp. 3485-3496
2. Campo M C et al. "Carbon molecular sieve membranes from cellophane paper" *Journal of Membrane Science,* 2010, vol. 350, pp. 180-188;
3. Teixeira M et al. "Composite phenolic resin-based carbon molecular sieve membranes for gas separation", *Carbon* 2011, vol. 49, pp. 4348-4358;
4. Teixeira M et al. "Carbon-Al2O3-Ag composite molecular sieve membranes for gas separation" *Chem. Eng. Res Des.* 2012, vol. 90, pp. 2338-2345.
5. Rodrigues S C, et al. "Preparation and characterization of carbon molecular sieve membranes based on resorcinole-formaldehyde resin" *J. Memb. Sci.* 2014, vol. 459, pp. 207-216.
6. Nguyen C., Do, D. D. "Adsorption of supercritical gases in porous media: determination of micropore size distribution". *J. Phys. Chem. B.* 1999, 103 (33), 6900-8, and
7. Nguyen C et al. "The structural characterization of carbon molecular sieve membrane (CMSM) via gas adsorption" *J. Memb. Sci.,* 2003, 220 (1-2) 177-82.
8. Melendez J et al., "Preparation and characterization of ceramic supported ultra-thin (~1 μm) Pd—Ag membranes", *J. Memb. Sci.* 2017, vol. 528, pp.12-23.

For reasons of completeness, various aspects of the invention are set out in the following numbered clauses:

1. A water-saturated carbon molecular sieve membrane obtainable by:
    a) providing a hydrophilic carbon molecular sieve membrane (CMSM) comprising pores of a pore size from 0.25 nm to 0.55 nm for molecular sieving, and of a pore size from higher than 0.55 nm to 0.90 nm for adsorption diffusion and a negligible amount of pores larger than 0.90 nm, such that a plot of $N_2$ permeance versus pressure of permeation at room temperature and at a pressure from 1 to 4 bar has zero or negative slope; and
    b) humidifying the membrane until obtaining a water-saturated carbon molecular sieve membrane.

2. The water-saturated carbon molecular sieve membrane of clause 1, wherein the CMSM is a composite alumina-carbon molecular sieve membrane (Al-CMSM).

3. The water-saturated carbon molecular sieve membrane of clause 2, wherein the Al-CMSM has a nitrogen content from 0.1 wt % to 4.0 wt %, an alumina content from 2.5 to 50% and a carbon content from 50 wt % to 95 wt %, with respect to the total weight of the membrane.

4. A process for the separation of a gas from a gas mixture, the process comprising:
    a) providing a water-saturated membrane as defined in any one of clauses 1 to 3;
    b) providing a gas mixture comprising at least two gases;
    c) feeding the gas mixture to the water-saturated CMSM at a temperature from 5° C. to 300° C. in order to get a retentate and a permeate, wherein feeding is carried out at a pressure such that the partial pressure of the gas in the retentate is higher than the partial pressure of the gas in the permeate and such that the membrane is a water-saturated membrane.

5. The process according to clause 4, wherein the temperature of step (c) from 5° C. to 250° C., from 5 to 120° C., from 15° C. to 120° C., from 15° C. to 100° C., from 15° C. to 70° C., or from 20° C. to 50° C.

6. The process according clauses 4 or 5, wherein the at least two gases have a polarizability from 2 to 27 and at least one of the at least two gases have a kinetic diameter less than 0.55 nm, and wherein if the at least two gases have a kinetic diameter lower than 0.55 nm, the difference of the kinetic diameter between the at least two gases is equal to or more than 0.01 nm and/or the difference of the polarizability between the at least two gases is equal to or more than 1 m³.

7. The process according to clause 6, wherein the at least two gases are selected from He, $H_2O$, Ne, $H_2$, NO, Ar, $NH_3$, $N_2$, $O_2$, CO, $CO_2$, $CH_4$, $C_2H_4$, $C_2H_6$, propene, propane, $H_2S$, methanol, and ethanol.

8. The process according to any one of clauses 4 to 7, wherein the gas mixture comprising at least two gases is selected from the group consisting of $H_2/CH_4$; $H_2/N_2$; $H_2/CO_2$; $CO_2/CH_4$; $CO_2/N_2$; $O_2/N_2$; and biogas.

9. The process according to clause 8, wherein the gas mixture comprises from 5% to 20% of $H_2$ and from 95% to 80% of $CH_4$, and wherein step c) is carried out at a hydrogen partial pressure difference equal to or higher than 3 bars and at a temperature of 40° C. or below.

10. The process according to clause 8, wherein the at least two gases are $CO_2$ and $N_2$ and the gas mixture comprises from 10% to 20% of $CO_2$ and from 65% to 75% of $N_2$, particularly about a 15% of $CO_2$ and about a 70% of $N_2$.

11. The process according to clause 8, wherein the at least two gases are $H_2$ and $CO_2$ and the gas mixture comprises from 55% to 65% of $H_2$ and from 30% to 40% of $CO_2$, particularly about a 60% of $H_2$ and about a 35% of $CO_2$.

12. The process according to clause 8, wherein the gas mixture comprising at least two gases is biogas, and $CO_2$ is removed from biogas.

13. Use of a water-saturated CMSM as defined in clauses 1 to 3 for the separation of a gas from a gas mixture.

14. Use of a water-saturated CMSM as defined in clauses 1 to 3 for solvent dehydration.

15. Use of a water-saturated CMSM as defined in clauses 1 to 3 as a membrane reactor.

The invention claimed is:

1. A water-saturated carbon molecular sieve membrane obtainable by a process comprising:
   i) providing a hydrophilic carbon molecular sieve membrane (CMSM) comprising pores of a pore size as defined herein from 0.25 nm to 0.55 nm for molecular sieving, and of a pore size from higher than 0.55 nm to 0.90 nm for adsorption diffusion and a negligible amount of pores larger than 0.90 nm, such that a plot of $N_2$ permeance as defined herein versus pressure of permeation at room temperature and at a pressure from 1 to 4 bar has zero or negative slope; and
   ii) humidifying the CMSM obtained in step i) to obtain a water-saturated CMSM by:
      treating it with water vapor at a temperature from 5° C. to 180° C. and at atmospheric pressure and a relative humidity higher than 95% during a period of time such that after further treatment with water vapor, the permeation flux of a non-adsorbable gas at 4 bar at the temperature at which the CMSM has been treated with water vapor is constant during a particular period of time; or
      alternatively, by exposing the CMSM to a $N_2$ or He gas stream saturated with water by bubbling the gas at a temperature from 5° C. to 180° C. into a tank filled with water such that after further exposure to the $N_2$ or He gas stream saturated with water, the permeation flux of a non-adsorbable gas at 4 bar and at the mentioned temperature is constant during a particular period of time.

2. The water-saturated carbon molecular sieve membrane of claim 1, wherein the CMSM is a composite alumina-carbon molecular sieve membrane (Al-CMSM).

3. The water-saturated carbon molecular sieve membrane of claim 2, wherein the Al-CMSM has a nitrogen content from 0.1 wt % to 4.0 wt %, an alumina content from 2.5% to 50% and a carbon content from 50 wt % to 95 wt %, with respect to the total weight of the membrane.

4. A process for the preparation of water-saturated composite alumina-carbon molecular sieve membrane (water-saturated Al-CMSM) comprising:
   i) preparing a hydrophilic Al-CMSM by:
      providing a porous $\alpha$-$Al_2O_3$ support;
      preparing a solution containing from 5 to 20 wt % of phenol formaldehyde resin, from 0.5 to 5 wt % of formaldehyde, from 0.1 to 2 wt % of ethylenediamine, from 0.1 to 5 wt % of boehmite in N-methyl-2-pyrrolidone, and heating the solution to carry out a pre-polymerization process in order to obtain a coating solution;
      dip-coating the porous $\alpha$-$Al_2O_3$ support in the coating solution in order to obtain a coated support;
      drying the coated support at a temperature from 70 to 120° C. in order to complete the polymerization process; and
      carbonizing the dried coated support at a carbonization temperature from 450° C. to 750° C. in order to obtain the hydrophilic Al-CMSM; and
   ii) humidifying the hydrophilic Al-CMSM prepared in step i) to obtain a water-saturated Al-CMSM by:
      treating the hydrophilic Al-CMSM with water vapor at a temperature from 5° C. to 180° C. and at atmospheric pressure and a relative humidity higher than 95% during a period of time such that, after further treatment with water vapor, the permeation flux of a non-adsorbable gas at 4 bar at the temperature at which the hydrophilic Al-CMSM has been treated with water vapor is constant during a particular period of time; or
      alternatively, by exposing the hydrophilic Al-CMSM to a $N_2$ or He gas stream saturated with water by bubbling the gas at a temperature from 5° C. to 180° C. into a tank filled with water such that after further exposure to the $N_2$ or He gas stream saturated with water, the permeation flux of a non-adsorbable gas at 4 bar and at the mentioned temperature is constant during a particular period of time.

5. The process according to claim 4, wherein the phenol formaldehyde resin is a novolac resin.

6. The process according to claim 4, wherein the carbonization temperature is from 450° C. to 700° C.

7. A water-saturated Al-CMSM obtainable by the process defined in claim 4.

8. A process for the separation of a gas from a gas mixture, the process comprising:
   a) providing the water-saturated membrane as defined in claim 1;
   b) providing a gas mixture comprising at least two gases; and
   c) feeding the gas mixture to the water-saturated CMSM at a temperature from 5° C. to 300° C. in order to get a retentate and a permeate, wherein feeding is carried out at a pressure such that the partial pressure of the gas in the retentate is higher than the partial pressure of the gas in the permeate and such that a difference in permeation is observed compared to the same CMSM without having been subjected to an humidifying step in order to get a water saturated membrane at the feeding temperature and pressure.

9. The process according to claim 8, wherein the at least two gases have a polarizability from 2 to 27 and at least one of the at least two gases have a kinetic diameter less than 0.55 nm, and
   wherein if the at least two gases have a kinetic diameter lower than 0.55 nm, the difference of the kinetic diameter between the at least two gases is equal to or more than 0.01 nm and/or the difference of the polarizability between the at least two gases is equal to or more than 1 m$^3$.

10. The process according to claim 9, wherein the at least two gases are selected from the group consisting of He, $H_2O$, Ne, $H_2$, NO, Ar, $NH_3$, $N_2$, $O_2$, CO, $CO_2$, $CH_4$, $C_2H_4$, $C_2H_6$, propene, propane, $H_2S$, methanol, and ethanol.

11. The process according to claim 8, wherein the gas mixture comprising at least two gases is selected from the group consisting of $H_2/CH_4$, $H_2/N_2$; $H_2/CO_2$; $CO_2/CH_4$, $CO_2/N_2$; $O_2/N_2$; and biogas.

12. The process according to claim 11, wherein the gas mixture comprises from 5% to 20% of $H_2$ and from 95% to 80% of $CH_4$, and wherein step c) is carried out at a hydrogen partial pressure difference equal to or higher than 3 bars and at a temperature of 40° C. or below.

13. The process according to claim 11, wherein the at least two gases are $CO_2$ and $N_2$ and the gas mixture comprises from 10% to 20% of $CO_2$ and from 65% to 75% of $N_2$.

14. The process according to claim 11, wherein the at least two gases are $H_2$ and $CO_2$ and the gas mixture comprises from 55% to 65% of $H_2$ and from 30% to 40% of $CO_2$.

15. The process according to claim 11, wherein the gas mixture comprising at least two gases is biogas, and $CO_2$ is removed from biogas, wherein biogas is a gas mixture comprising methane and carbon dioxide.

16. A process for removal of water from an organic solvent, the process comprising:
applying vacuum from a permeated side of the water-saturated CMSM as defined in claim 1.

17. A process for in situ removal of water during a catalytic reaction in which water is produced, the process comprising:
carrying out the catalytic reaction in a membrane reactor, wherein the membrane reactor is the water-saturated CMSM as defined in claim 1.

18. A process for the separation of a gas from a gas mixture, the process comprising:
a) providing a water-saturated membrane as defined in claim 7;
b) providing a gas mixture comprising at least two gases; and
c) feeding the gas mixture to the water-saturated CMSM at a temperature from 5° C. to 300° C. in order to get a retentate and a permeate, wherein feeding is carried out at a pressure such that the partial pressure of the gas in the retentate is higher than the partial pressure of the gas in the permeate and such that a difference in permeation is observed compared to the same CMSM without having been subjected to an humidifying step in order to get a water saturated membrane at the feeding temperature and pressure.

19. A process for removal of water from an organic solvent, the process comprising:
applying vacuum from a permeated side of the water-saturated Al-CMSM of claim 7.

20. A process for in situ removal of water during a catalytic reaction in which water is produced, the process comprising:
carrying out the catalytic reaction in a membrane reactor, wherein the membrane reactor is the water-saturated Al-CMSM of claim 7.

* * * * *